United States Patent [19]

Boda et al.

[11] Patent Number: 4,942,530
[45] Date of Patent: Jul. 17, 1990

[54] CONTROL OF VEHICLE AUTOMATIC TRANSMISSION

[75] Inventors: Keiji Boda, Hiroshima; Kouichirou Waki, Mihara; Kazuo Niide, Hiroshima; Hiroaki Yokota, Higashi-Hiroshima; Keizo Yanagisawa, Fuji; Hokuto Takeuchi, Fujinomiya, all of Japan

[73] Assignees: Mazda Motor Corporation, Hiroshima; Japan Automatic Transmission Co., Ltd., Fuji, both of Japan

[21] Appl. No.: 162,642

[22] Filed: Mar. 1, 1988

[30] Foreign Application Priority Data

Mar. 2, 1987 [JP]  Japan .................................. 62-45323
Jun. 12, 1987 [JP]  Japan .................................. 62-146294

[51] Int. Cl.$^5$ ..................... B60K 41/18; B60K 41/16; G05D 17/02
[52] U.S. Cl. ..................... 364/424.1; 74/866; 74/867
[58] Field of Search ............... 364/424.1; 74/866, 867, 74/868, 869

[56] References Cited

U.S. PATENT DOCUMENTS

| | | | |
|---|---|---|---|
| 3,754,482 | 8/1973 | Sanders et al. ................... | 74/752 A |
| 4,283,970 | 8/1981 | Vukovich ........................ | 74/866 |
| 4,633,739 | 1/1987 | Ogasawara et al. ............... | 74/869 |
| 4,667,540 | 5/1987 | Yagi ............................. | 74/866 |
| 4,707,789 | 11/1987 | Downs et al. ................... | 364/424.1 |
| 4,709,596 | 12/1987 | Boda et al. ..................... | 74/866 |
| 4,730,519 | 3/1988 | Nakamura et al. ............... | 74/866 |
| 4,744,031 | 5/1988 | Takeda et al. .................. | 364/424.1 |
| 4,754,403 | 6/1988 | Hiramatsu ....................... | 364/424.1 |
| 4,779,491 | 10/1988 | Fujiwara et al. ................ | 74/868 |

FOREIGN PATENT DOCUMENTS 56-156543 12/1981 Japan .

Primary Examiner—Felix D. Gruber
Attorney, Agent, or Firm—Fleit, Jacobson, Cohn, Price, Holman & Stern

[57] ABSTRACT

An automatic transmission including a torque converter and a multiple stage transmission gear mechanism. A hydraulically actuated brake and a hydraulically actuated clutch is provided for alternate engagement to select alternately one of two adjacent gear stages. In order to prevent gear shift shock, the engaging of the clutch or the brake is controlled so that the engaging rate is faster for a predetermined time period in an initial period of a gear shifting operation than in a remainder period. A control circuit is provided to monitor the gear shifting operation and modifying the predetermined time period in accordance with the results of the latest gear shifting operation and store the modified value for the use in a next gear shifting operation.

19 Claims, 21 Drawing Sheets

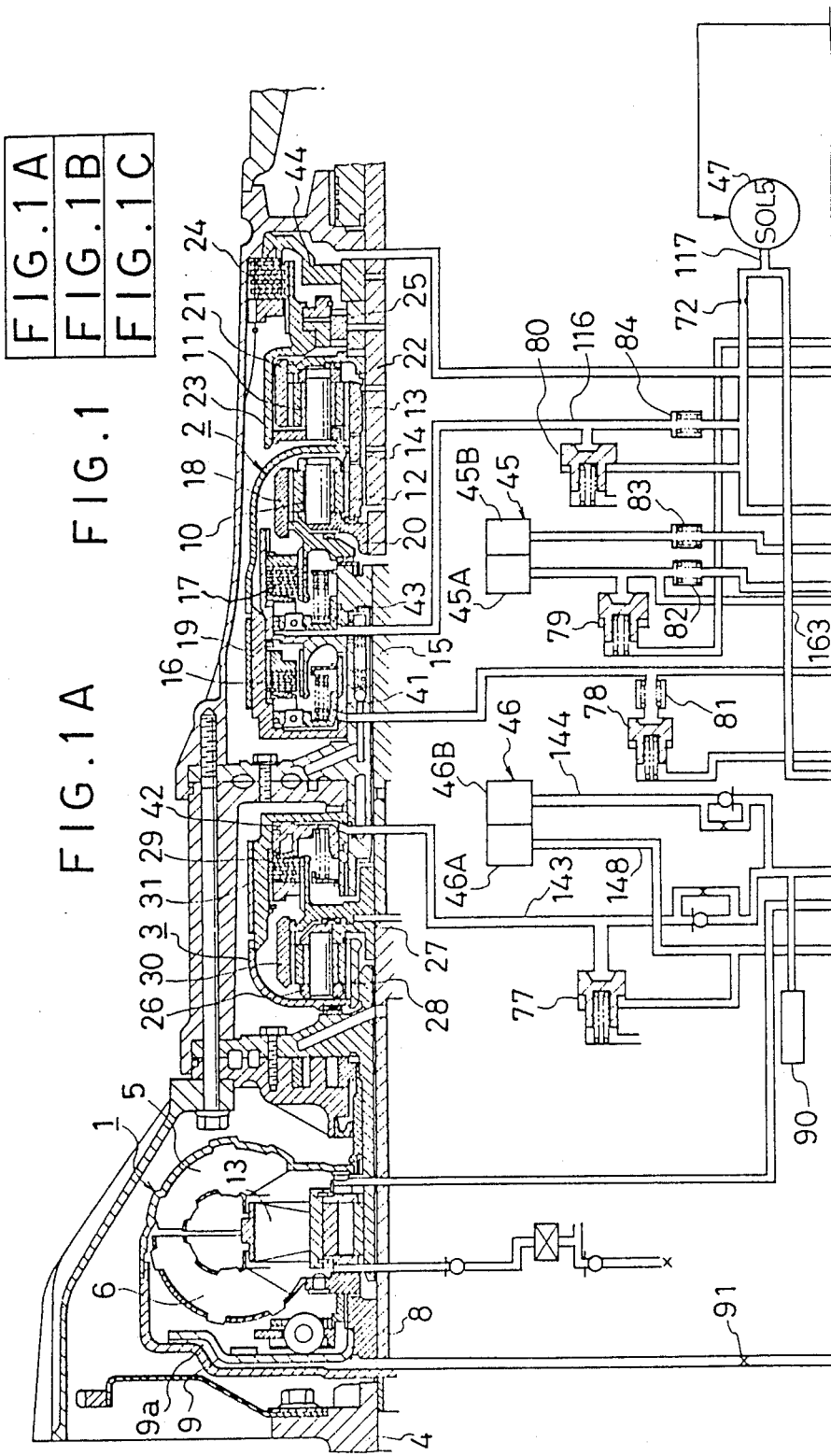

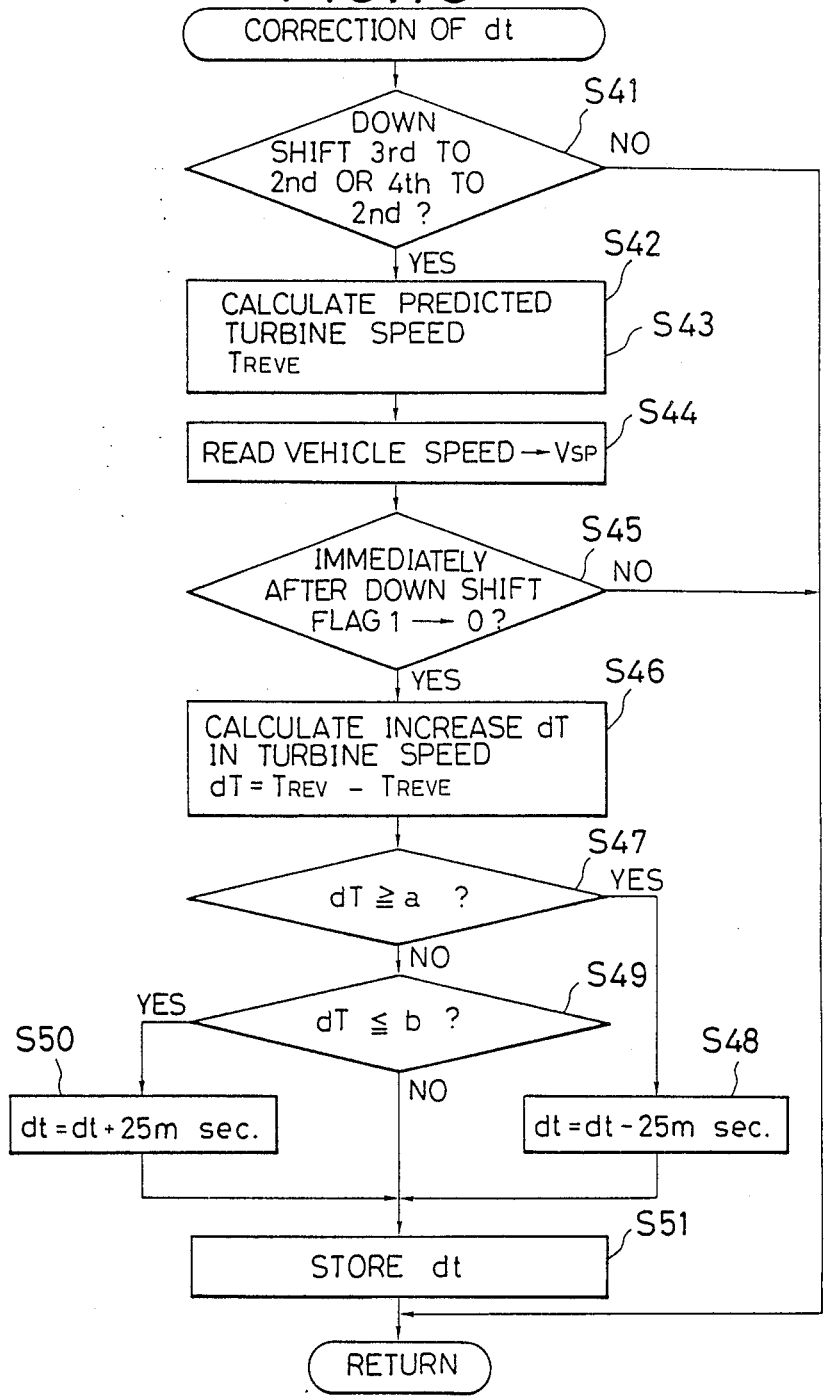

CONTROL OF VEHICLE AUTOMATIC TRANSMISSION

BACKGROUND OF THE INVENTION

1. Field of the Invention

The present invention relates to a control of a vehicle automatic transmission which has a multiple stage transmission gear mechanism and in which an appropriate gear stage of the gear mechanism is automatically selected in accordance with the vehicle operating conditions. More specifically, the present invention pertains to an automatic transmission control system which can minimize the gear shift shock.

2. Description of the Prior Art

A vehicle automatic transmission generally includes a transmission gear mechanism having a plurality of gear stages of different gear ratios and an appropriate gear stage is automatically selected in accordance with the vehicle operating conditions. For selecting the gear stage, the transmission gear mechanism is provided with an appropriate number of friction devices such as clutches and/or brakes so that elements of the gear mechanism are selectively constrained by the friction devices to determine the desired gear train in the gear mechanism. The friction devices are provided with hydraulic actuators which are operated through valves controlled by a control unit.

In this type of automatic transmission, it is required to minimize the shift shocks which are produced when the transmission gear mechanism is shifted from one gear stage to another gear stage. The Japanese patent application No. 55-61070 filed on May 7, 1980 and laid open to public inspection on Dec. 3, 1981 under the laid-open No. 56-156543 discloses a transmission control system which is aimed to decrease the transmission shift shock. According to the proposal by the Japanese application, the actuator is provided with a plurality of drain passages having flow restrictions of different sizes. The flow restrictions are controlled so that the flow restriction of the largest size is at first used in the initial stage of actuation of the actuator to thereby move the actuator at a faster rate and sequentially switch to a flow restriction of a smaller size to decrease the rate of movement of the actuator.

It is understood that the control system as proposed by the Japanese application is effective to decrease the shifting shock of the transmission gear mechanism to a certain extent. However, there still is a possibility that a shift shock will be produced due to wear or other changes in the actuators and the friction devices. More specifically, the actuators and the friction devices may be dimensionally different due to manufacturing tolerances and such dimensional differences may cause differences in the conditions wherein the actuators are actuated and the friction devices are engaged. It may be possible to adjust the friction devices during the manufacture of the transmission so that the gear shifting operations are carried out with a minimum gear shift shock. However, even when such adjustments are made when the transmission is manufactured, different conditions are produced through prolonged use of the transmission due to wear and/or change in the adjustment of the friction devices. For example, when the friction device is engaged to shift the transmission gear mechanism from a lower gear stage up to a higher gear stage, the aforementioned wear and/or change in the adjustment of the friction devices through a prolonged use may cause a substantial change in the rate of engagement of the friction devices. In a case where the rate of engagement is increased there will be an increase in the gear shift shock. To the contrary, when the rate of engagement is decreased, there will be a preferable effect on the gear shift shock. However, there will be an increase in the slip of the friction members so that the life of the friction device is decreased.

In some types of automatic transmissions, two gear stages are alternately selected by operating two friction devices. For example, in a transmission having a transmission gear mechanism with four forward gear stages, the shifting operation between the second and third gear stages may be carried out by actuations of a clutch and a brake so that the third gear stage is established by engaging the clutch and disengaging the brake whereas the second gear stage is established by disengaging the clutch and engaging the brake. The hydraulic control system for the transmission is designed so that the clutch and the brake are applied with the hydraulic pressure from the same line in such a manner that pressure for engaging the clutch is used to disengage the brake. Further, the clutch and the brake have a common drain line so that the hydraulic pressure is drained from the drain line to disengage the clutch and engage the brake.

In this type of automatic transmission, it is important to have the operating timings of the clutch and the brake matched with each other. Particularly, there is a strong possibility that a shift shock will be produced when the transmission gear mechanism is shifted down from the third gear stage to the second gear stage. Even when the drain system as taught by the aforementioned Japanese application is adopted, it is difficult to avoid the gear shift shock.

The U.S. Pat. No. 4,283,970 proposes another measure for preventing the gear shift shock in an automatic transmission. According to the proposal by this U.S. patent the hydraulic pressure is appropriately controlled so that the shifting operation is completed in a desirable time period. More specifically, the hydraulic pressure is controlled so that the rate of engagement of the friction device is desirably controlled throughout the time period of bringing the friction device from the disengaged position to the engaged position However, the proposed control is not effective in preventing the gear stage shift shock because no measure is provided for adjusting the rate of engagement of the friction device in the final period of the gear shifting operation.

SUMMARY OF THE INVENTION

It is therefore an object of the present invention to provide a control system for a vehicle automatic transmission having a transmission gear mechanism with a plurality of gear stages, the control system being able to carry out gear stage shifting operations without producing uncomfortable shift shocks.

Another object of the present invention is to provide an automatic transmission control in which the gear stage shift shocks are substantially decreased.

A further object of the present invention is to provide a control system for an automatic transmission in which the rates of engagement and/or disengagement of the friction devices are appropriately changed during each gear shifting operation so that the shift shock can substantially be decreased.

According to the present invention, the above and other objects can be accomplished by engaging the friction device at a faster rate for a predetermined time period in the initial period than in the later period and determining the said time period for the next gear shifting operation in accordance with the rate of change in the input speed of the transmission gear mechanism. Thus, the present invention provides a vehicle automatic transmission including a transmission gear mechanism having an input means and a plurality of gear stages of different gear ratios, a plurality of friction mechanisms which are adapted to be selectively engaged to select one of the gear stages, means for adjusting rate of engagement of the friction mechanisms, control means for controlling the adjusting means to engage the friction mechanism at a faster rate in an initial period from a start of an engaging operation for a predetermined time period than in a remaining period of the engaging operation, speed detecting means for detecting a rotation speed of the input means of the transmission gear mechanism, said control means including compensating means responsive to a change in the rotation speed of the input means of the transmission gear mechanism for changing based on the change in the rotation speed of the input means of the transmission gear mechanism during the latest gear shifting operation said predetermined time period for a next gear shifting operation.

According to the features of the present invention, it is possible to engage the friction mechanism in a decreased time period without producing an uncomfortable gear shift shock. Since the predetermined time period in which the rate of engagement is increased is changed taking into account the change of the input speed to the transmission gear mechanism in the latest gear shift operation, it is possible to control the engagement of the friction mechanism in a manner wherein the shift shock is avoided even when there is any change in the wear or other condition of the friction mechanism.

The above and other objects and features of the present invention will become apparent from the following description of a preferred embodiment taking reference to the accompanying drawings

BRIEF DESCRIPTION OF THE DRAWINGS

FIGS. 1A, 1B, 1C taken together as shown in FIG. 1 are sectional views of an automatic transmission to which the present invention can advantageously be applied;

FIGS. 10 through 14 show flow charts of the shift down operation of the control unit;

DESCRIPTION OF THE PREFERRED EMBODIMENT

Figure 1B:
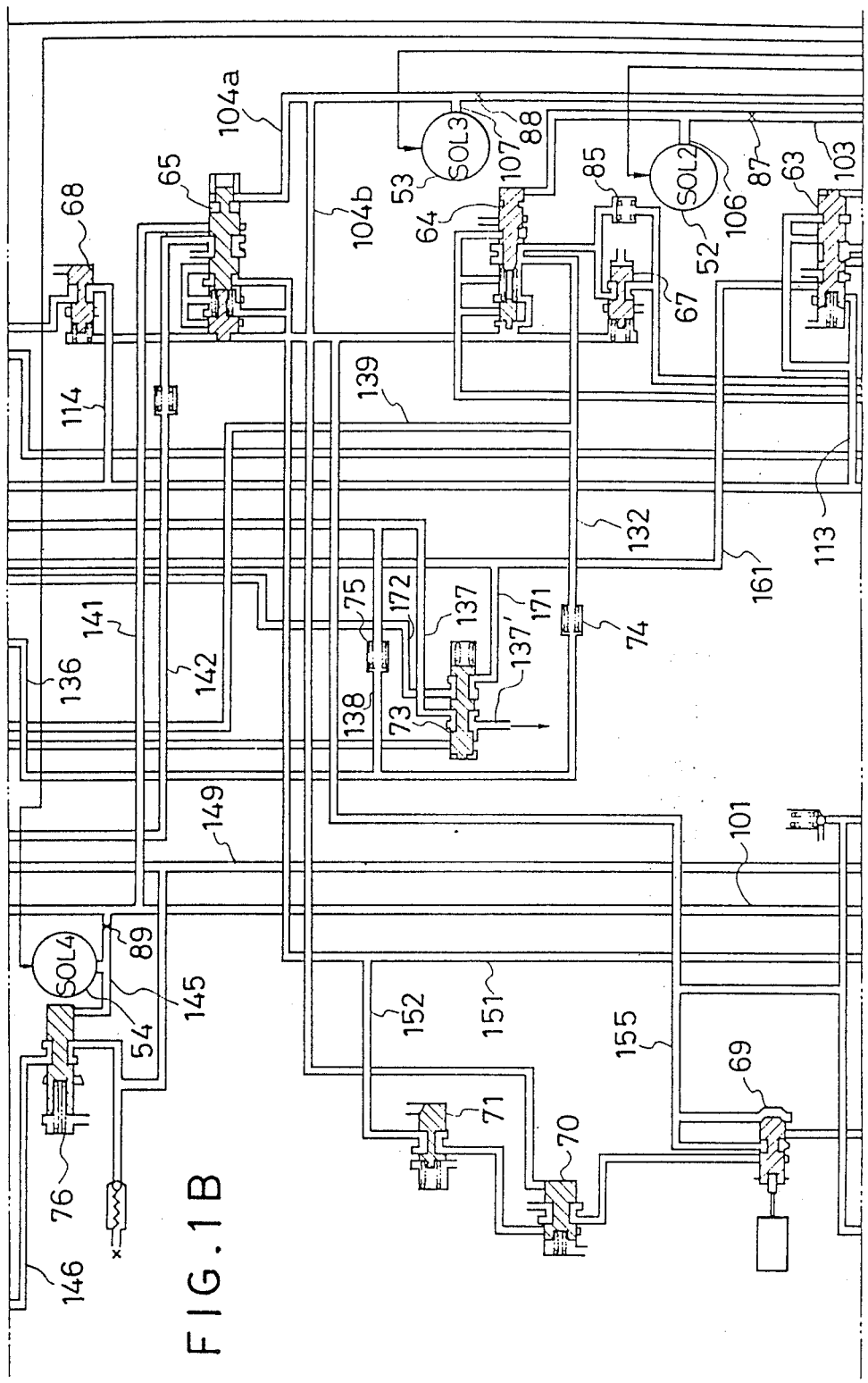
Figure 1C:
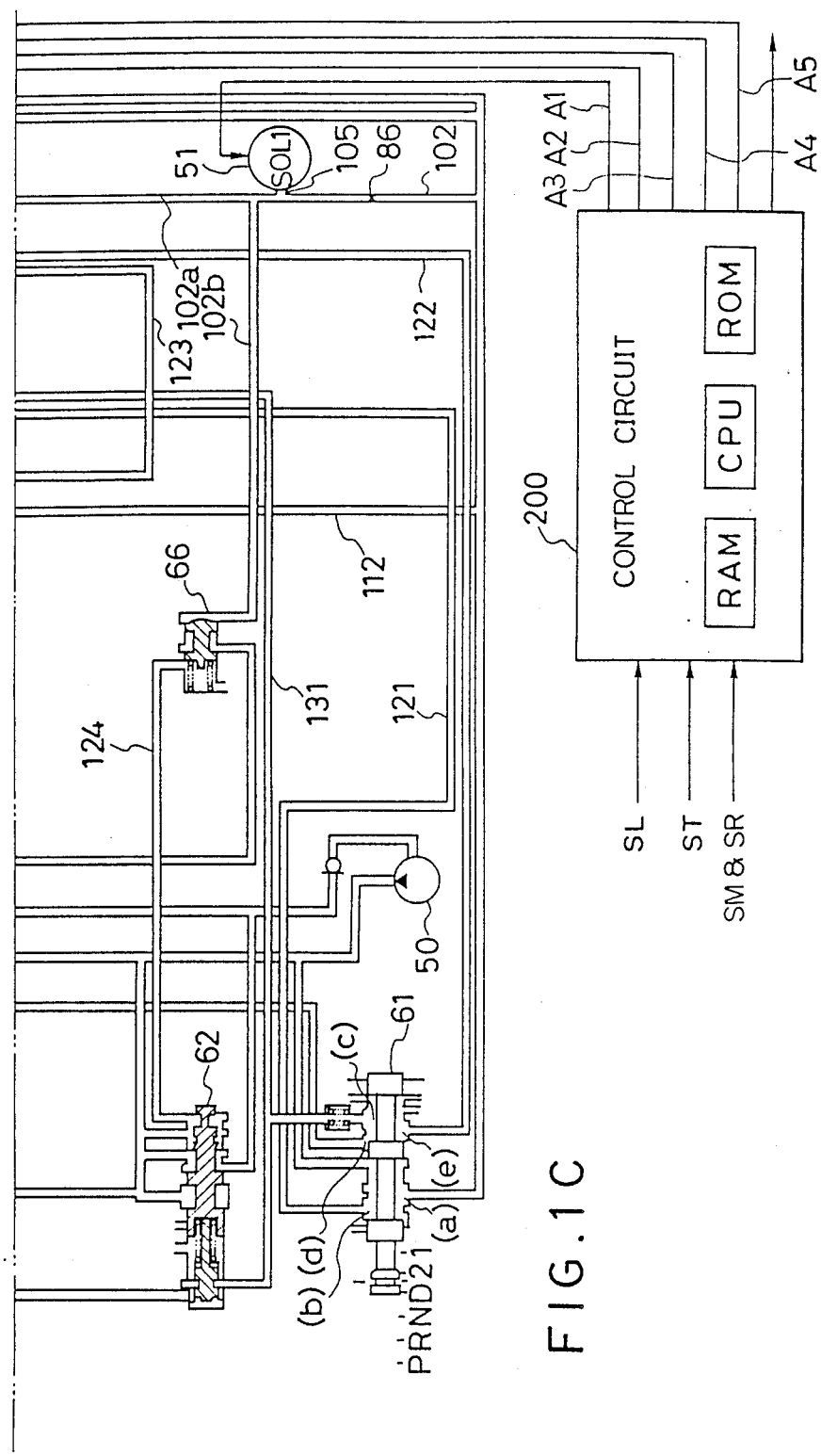

Referring to the drawings, particularly to FIG. 1, there is shown an automatic transmission which comprises a hydraulic torque converter 1, a multiple stage transmission gear mechanism 2, and a planetary gear type over-drive transmission mechanism 3 arranged between the torque converter 1 and the multiple stage transmission gear mechanism 2.

The torque converter 1 has a pump 5 connected to an engine output shaft 4, a turbine 6 provided facing the pump 5 and a stator 13 disposed between the pump 5 and the turbine 6. A converter output shaft 8 is connected to the turbine 6. A lock-up clutch 9 is provided between the converter output shaft 8 and the pump 5. The lock-up clutch 9 is normally urged into engagement to lock up the engine output shaft 4 to the converter output shaft 8 under the pressure of hydraulic fluid which circulates in the torque converter 1, and is released by a disengaging hydraulic pressure which is supplied to its pressure chamber 9a from an external pressure source.

The multiple stage transmission gear mechanism 2 has a front planetary gear unit 10 and a rear planetary gear unit 11. The front planetary gear unit 10 has a sun gear 12 connected with a sun gear 13 of the rear planetary gear unit 11 by way of a connecting rod 14. The gear mechanism 2 has an input shaft 15 connected through a front clutch 16 with the connecting rod 14 and through a rear clutch 17 with an internal gear 18 of the front planetary gear unit 10. A second brake 19 is provided between the connecting rod 14 of the sun gears 12 and 13 of the gear units 10 and 11, and a casing of the transmission. The gear mechanism 2 also has an output shaft 22 connected with a planetary carrier 20 of the front planetary gear unit 10 and an internal gear 21 of the rear planetary gear unit 11. The rear planetary gear unit 11 has a planetary carrier 23, and there are provided between the planetary carrier 23 and the transmission casing a low and reverse brake 24 and a one-way clutch 25.

The multiple stage transmission gear mechanism 2 is of a known type and can provide three forward speeds and one reverse by selectively actuating the front clutch 16, the rear clutch 17, the second brake 19 and the low and reverse brake 24 by a hydraulic actuator as will be described later.

The planetary gear type over-drive transmission mechanism 3 includes planetary gears 26, a planetary carrier 27 rotatably carrying the planetary gears 26, and a sun gear 28 engaged with an internal gear 30 by way of direct connection clutch 29. An over-drive brake 31 is provided between the sun gear 28 and the transmission casing. The internal gear 30 is connected with the input shaft 15 of the multiple stage transmission gear mechanism 2.

The planetary gear type over-drive transmission mechanism 3 connects the convertor output shaft 8 and the input shaft 15 of the transmission gear mechanism 2 directly when the direct connection clutch 29 engages and the overdrive brake 31 is released, and provides an over-drive connection between the shafts 8 and 15 when the brake 31 is engaged and the clutch 29 is disengaged.

In this transmission, when the driver operates the selector lever to move a manual valve 61 (to be described later), the frictional members (clutches and brakes) of the multiple stage transmission gear mechanism 2 and the overdrive transmission mechanism 3 are selectively operated to shift the transmission to the gear speed selected by the selector lever. The relation between the conditions of the frictional members and the gear speeds are as shown in the following table.

TABLE 1

| RANGE | | FRICTIONAL MEMBER | | | | | | | |
|---|---|---|---|---|---|---|---|---|---|
| | | REAR CLUTCH (17) | FRONT CLUTCH (16) | LOCK-UP CLUTCH (9) | DIRECT CONNECTION CLUTCH (29) | LOW AND REVERSE CLUTCH (24) | SECOND BRAKE (19) | OVER-DRIVE BRAKE (31) | ONE-WAY CLUTCH (25) |
| P | | | | | O | | | | |
| R | | | O | | O | O | | | |
| N | | | | | O | | | | |
| D | 1 | O | | | O | | | | O |
| | 2 | O | | O | O | | O | | |
| | 3 | O | O | O | O | | | | |
| | 4 | O | O | O | | | | O | |
| 2 | | O | | | O | | O | | |
| 1 | 1 | O | | | O | O | | | |
| | 2 | O | | | O | | O | | | respective pilot lines 102, 103 and 104 are closed, and pilot pressure is established in each pilot line, whereby the shift valves 63, 64 and 65 are moved from an OFF-position (the rightmost position) to an ON-position (the leftmost position) to open or close hydraulic circuits of the frictional members related thereto. The relations between the gear speeds and the condition of the solenoids are shown in the following table.

TABLE 2

| | solenoid | | |
|---|---|---|---|
| gear speed | 1-2 shift solenoid valve | 2-3 shift solenoid valve | 3-4 shift solenoid valve |
| 1 | off | off | off (on) |
| 2 | on | off | off (on) |
| 3 | on | on | off |
| 4 | on | on | on |

Though the 3-4 shift solenoid valve 53 is off when the transmission is to be in first and second in D-range, it is on when the transmission is to be in first and second in 1-range and 2-range as shown in brackets in Table 2. This is for loading a backup control valve 70 (to be described later) with a pilot pressure by energizing the 3-4 shift solenoid valve 53 in 1-range and 2-range.

The hydraulic control circuit for controlling the frictional members has an oil pump 50. Hydraulic oil discharged from the pump 50 is introduced into the manual valve 61 by way of a pressure line 101 after the oil pressure is adjusted by a pressure regulating valve 62. The manual valve 61 has a plunger which can be selectively positioned in one of shift positions 1, 2, D, N, R and P. The manual valve 61 has five ports a to e. The port a is communicated with the pressure line 101, when the manual valve 61 is positioned in any one of the positions 1, 2 and D. The port b is communicated with the pressure line 101 when the manual valve is in either the position 2 or D. The port is communicated with the pressure line 101 when the manual valve 61 is in the position R. The port d is communicated with the pressure line 101 when the manual valve 61 is in any one of the positions 1, 2, R and P. The port e is communicated with the pressure line 101 when the manual valve 61 is in either the position 1 or R.

The port a is communicated with a line 111. Line 111 is branched into first to third pilot lines 102, 103 and 104. The first pilot line 102 is provided with a 1-2 shift solenoid valve 51 for controlling a 1-2 shift valve 63 and a throttling valve 86. The second pilot line 103 is provided with a 2-3 shift solenoid valve 52 for controlling a 2-3 shift valve 64 and a throttling valve 87. The third pilot line 104 is provided with a 3-4 shift solenoid valve 53 for controlling a 3-4 shift valve 65 and a throttling valve 88. When the solenoid valves 51, 52 and 53 are energized (ON), drain lines 105, 106 and 107 for the The first pilot line 102 is branched into first and second branch lines 102a and 102b downstream of the 1-2 shift solenoid valve 51. The first branch line 102a is communicated with the right end portion (the pilot pressure receiving portion) of the 1-2 shift valve 63. The second branch line 102b is communicated with the right end portion (the pilot pressure receiving portion) of a cutback valve 66.

The line pressure is applied to opposite end portions of the 1-2 shift valve 63 by way of a line 112 branching off from the line 111 and by way of a line 113 further branching off from the line 112. Further, the line pressure is applied to an intermediate portion of the 1-2 shift valve 63 by way of a line 122 communicating with the port e of the manual valve 61. The line 122 is communicated with a line 123 when the 1-2 shift valve 63 is off, that is, when the valve 63 is in the position for first. The line 123 is connected to a low and reverse brake actuator 44. On the other hand, the line 113 is communicated with a line 161 when the 1-2 shift valve 63 is on, that is, when the valve 63 is in the position for the gear speeds other than first. The line 161 is connected to the applying side 45A of a second brake actuator 45 by way of a one-way throttling valve 82. An accumulator 79 is provided in the line 161 near the actuator 45 and the back pressure of the accumulator 79 is controlled by a reducing valve 68. A line 171 branches off from the line 161 and is communicated with a line 172 by way of a 3-2 timing valve 73. The line 172 is communicated with the applying side 45A of the second brake actuator 45.

The 2-3 shift valve 64 is turned on and off by a pilot pressure applied through the line 103 connected to the right end portion thereof. To the 2-3 shift valve 64 are connected a line 121 communicated with the port b of the manual valve 61 and a line 131 communicated with the port c of the manual valve 61.

When the 2-3 shift valve 64 is on (the position for third and fourth), the line 121 is communicated with a line 132, and when the 2-3 shift valve 64 is off (the position for third and second), the line 131 is communicated with the line 132 instead of the line 121. To the line 131 are connected in parallel a reducing valve 67 and a one-way orifice 85.

The downstream side portion of the line 132 branches into a line 136 connected to a front clutch actuator 41 and line 138 connected to the releasing side 45B of the second brake actuator 45. The line 132 is provided at a portion upstream of the junction of the lines 136 and 138 with a one-way orifice 74 for throttling hydraulic oil flowing toward the junction. The line 138 is provided at a portion immediately downstream of the junction of the lines 136 and 138 with a check valve 75 for preventing hydraulic oil from flowing from the side of the second brake actuator 45 to the side of the 2-3 shift valve 64. To a portion of the line 138 downstream of the check valve 75 is connected a line 137 provided with the 3-2 timing valve 73.

The 3-2 timing valve 73 has a spool which is displaced rightward under the pilot pressure imparted to the left end portion thereof, and breaks the communications between the line 137 and a drain 137' and betweeen the lines 171 and 172. The pilot pressure receiving portion or the left end portion of the 3-2 timing valve 73 is communicated with the line 112 by way of a line 163. A constriction 72 is provided at the junction of the lines 163 and 112, and a drain line 117 is connected to the line 163. A timing control solenoid valve 47 is provided in the drain line 117 and a predetermined pilot pressure is established in the line 163 when the solenoid valve 47 is energized. A one-way orifice 83 is provided in the line 138 downstream of the junction of the line 137 to the line 138.

An accumulator 78 is connected to the line 136 by way of a one-way orifice 81 for throttling hydraulic oil flowing out from the accumulator 78. The back pressure of the accumulator 78 is controlled by the reducing valve 67 through a line pressure applied to the accumulator 78 by way of a line 139 branching off from the line 132.

The third pilot line 104 branches at a portion downstream of the 3-4 shift solenoid valve 53 into first and second branch lines 104a and 104b. The first branch line 104a is communicated with the 3-4 shift valve 65 at the right end portion of the valve 65, and the second branch line 104b leads the pilot pressure to a backup control valve 70 (to be described later).

To an intermediate portion of the 3-4 shift valve 65 is connected a line 141 branching off from the pressure line 141. The line 141 is communicated with a line 142 when the 3-4 shift valve 65 is off (the position for the gear speeds other than fourth). The downstream end portion of the line 142 branches into a line 143 communicated with a direct clutch actuator 42 and a line 144 communicated with the releasing side 46B of an over drive brake actuator 46. A hydraulic pressure switch 90 is provided in the line 142 upstream of the junction of the lines 143 and 144. Further, an accumulator 77 is provided in the line 143. Further, the applying side 46A of the over-drive brake actuator 46 is communicated with the pressure line 101 by way of a line 148.

To the left end portion of the 3-4 shift valve 65 is connected a line 151 communicated with the port d of the manual valve 61. The 3-4 shift valve 65 has a spool which is positively held in the off-position by the line pressure applied thereto through the line 151 in the ranges other than D-range. A line 152 branches off from the line 151 and is communicated with a vacuum throttling valve 69. In the line 152 is provided a throttle backup valve 71 upstream of the backup control valve 70 in series therewith. The throttle backup valve 71 applies to the vacuum throttle valve 69 the line pressure established in the line 152 in 1-range and 2-range to drive, by way of the vacuum throttle valve 69, the pressure regulating valve 62 to increase the line pressure. The backup control valve 70 is disposed between the throttle backup valve 71 and the vacuum throttling valve 69, and opens the line 152 to permit the throttle backup valve 71 to increase the line pressure when the pilot pressure is established in the second branch line 104b, that is, when the 3-4 shift solenoid valve 53 is turned on.

The line 112 is connected at a portion upstream of the constriction 72 to a line 116 with which a rear clutch actuator 43 is communicated. The line 116 is provided with an accumulator 80 and a one-way orifice 84. A line 114 branching off from the line 112 is provided with the reducing valve 68 for controlling the back pressure of the accumulator 79.

A line 149 is communicated with the pressure chamber 9a of the lock-up clutch 9 by way of a line 146 provided with a lock-up valve 76 and a constriction 91. A pilot line 145 for the lock-up valve 76 is provided with a constriction 89 and a lock-up solenoid valve 54, and the lock-up clutch 9 is disengaged when the lock-up solenoid valve 54 is energized to establish the pilot pressure in the pilot line 145 to drive the lock-up valve 76 to communicate the lines 146 and 149. In this particular embodiment, the lock-up clutch 9 is engaged only in first to third in the D-range.

The hydraulic control circuit is controlled by a control circuit 200 which may be a one-chip microcomputer and comprises an input/output section, a random-access memory RAM, a read-only memory ROM and a central processing unit CPU. Various signals representing conditions of the engine are input into the control circuit 200 from sensors provided in predetermined positions. For example, a load signal SL is input into the control circuit 200 from an engine load sensor which detects the engine load by way of the throttle opening and a turbine rpm signal ST (or a vehicle speed signal) is input into the control circuit 200 from a turbine rpm sensor control circuit 200, in a well known and entirely conventional fashion, also receives signals SM and SR, respectively, from a mode switch (not shown), which indicates an operation mode which is selected from among normal, power and economy modes, and from a sensor for detecting an automatic transmission shift range (not shown), selected from among a parking (P), reverse (R), neutral (N), drive (D), second (2) and low (1) shift ranges. The CPU detects the vehicle operating condition by way of the signals, and determines the gear speed and then outputs control signals for driving the solenoid valves to shift the transmission into the determined gear speed. That is, the shift solenoid valves 51, 52 and 53, the lock-up solenoid valve 54 and the solenoid valve 47 for timing control are selectively turned on and off according to the gear speed determined by the CPU in the control pattern shown in table 2 under the control of the control signals A1, A2, A3, A4 and A5 output from the CPU. Then the frictional members are operated in the pattern shown in table 1 to shift the transmission into the determined gear speed.

In this embodiment, the engaging timing of the second brake 19 when the transmission is shifted down from third to second in D-range and that when the transmission is shifted up from first to second in D-range are controlled to prevent occurrence of shift shock due to improper engaging timing of the second brake 19.

Figure 2:
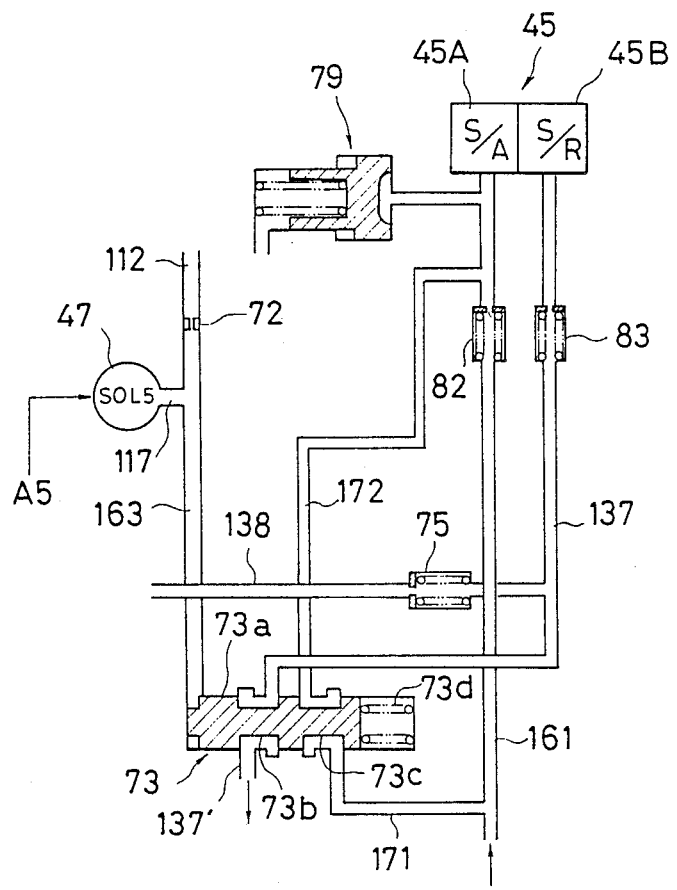
FIG. 2 is an enlarged view showing a part of the hydraulic control system in the transmission shown in FIG. 1.

Since the general operation of the control circuit 200 is known, only a part of the operation of the control circuit 200 related to the present invention will be described, hereinbelow. FIG. 2 shows a part of the hydraulic control circuit shown in FIG. 1 for controlling the line pressure applied to the second brake actuator 45.

The operation of the second brake upon upshift from first to second will be described first, hereinbelow. When the transmission is in first, the solenoid valve 47 is off under the control of the control signal A5 to open the drain line 117, and accordingly, the pressure in the line 163 which forms the pilot pressure of the 3-2 timing valve 73 is zero. Accordingly, the spool 73a of the 3-2 timing valve 73 is moved leftward to the position shown in FIG. 2 under the force of the spring 73d so that the lines 137 and 137' are communicated with each other by way of a spool groove 73b and the lines 171 and 172 are communicated with each other by way of a spool groove 73c. Since the line 137' is directly communicated with the drain side, no hydraulic pressure is imparted to the releasing side 45B of the second brake actuator 45. Further, the 1-2 shift solenoid valve 51, the 2-3 shift solenoid valve 52 and the 3-4 shift solenoid valve 53 are all off, and the hydraulic pressure in the lines 137 and 161 is zero. Accordingly, the hydraulic pressure imparted to the applying side 45A of the second brake actuator 45 is also zero. When the pressure on the applying side 45A and the pressure on the releasing side 45B are equal to each other as in this case, the actuator 45 keeps the second brake 19 released. The second brake 19 is thus kept released when the transmission is in first.

When the 1-2 shift solenoid valve 51 is turned on to cause the transmission to upshift to second in this state, the timing control solenoid valve 47 is turned on under the control of the control signal A5, whereby the drain line 117 is closed to establish the pilot pressure in the line 163. Under the pilot pressure in the line 163, the spool 73a of the 3-2 timing valve 73 is moved rightward overcoming the force of the spring 73d, and the communications between the lines 137 and 137' and between the lines 171 and 172 are broken. Further, the 1-2 shift solenoid valve 51 is turned on and accordingly the 1-2 shift valve 63 is actuated to apply the line pressure to the line 161. Since the communication between the lines 171 and 172 is broken at this time, the line pressure applied to the line 161 is applied to the engaging side 45A of the second brake actuator 45 through the one-way orifice 82. Since the applying side 45A is communicated with the accumulator 79, the hydraulic pressure in the applying side 45A is gradually increased and the second brake 19 is gently engaged, thereby preventing occurrence of shock upon upshift from first to second. Though the communication between the lines 137 and 137' is broken, the hydraulic pressure in the releasing side 45B of the actuator 45 is kept at zero since the line 138 is communicated with the drain when the transmission is in second.

Now the operation of the second brake 19 upon downshift from third to second will be described. When the transmission is in third, the timing control solenoid valve 47 is on under the control of the control signal A5, and the spool 73a of the 3-2 timing valve 73 is held in the right position under the line pressure in the line 163. Further, the 1-2 shift solenoid valve 51 and the 2-3 shift solenoid valve 52 are on while the 3-4 shift solenoid valve 53 is off, and the line pressure is applied to both the lines 137 and 161. Accordingly, the line pressure is imparted to both the applying side 45A and the releasing side 45B of the second brake actuator 45. That is, the pressures in the applying side 45A and the releasing side 45B are equal to each other, and accordingly the second brake 19 is kept released.

When the 2-3 shift solenoid valve is turned off to cause the transmission to downshift to second in this state, the 2-3 shift valve 64 is driven to communicate the line 138 with the drain. At the same time, the timing control solenoid valve 47 is turned off under the control of the control signal A5, the hydraulic pressure in the line 163 is nullified, and the spool 73a of the 3-2 timing valve 73 is moved leftward under the force of the spring 73d. When the spool 73a is moved leftward, the lines 137 and 137' are communicated with each other so that the releasing side 45B of the second brake actuator 45 is directly communicted with the drain to abruptly nullify the hydraulic pressure in the releasing side 45B. At the same time, the lines 171 and 172 are communicated with each other and the line pressure applied to the line 161 is applied to the applying side 45A of the second brake actuator 45 not only by way of the one-way orifice 82 but also by way of the lines 171 and 172 bypassing the one-way orifice 82. Accordingly, discharge of the hydraulic pressure from t he releasing side 45B and application of the hydraulic pressure to the applying side 45A can be quickly effected, whereby delay in the engaging timing of the second brake upon downshift from third to second can be prevented.

Figure 3:
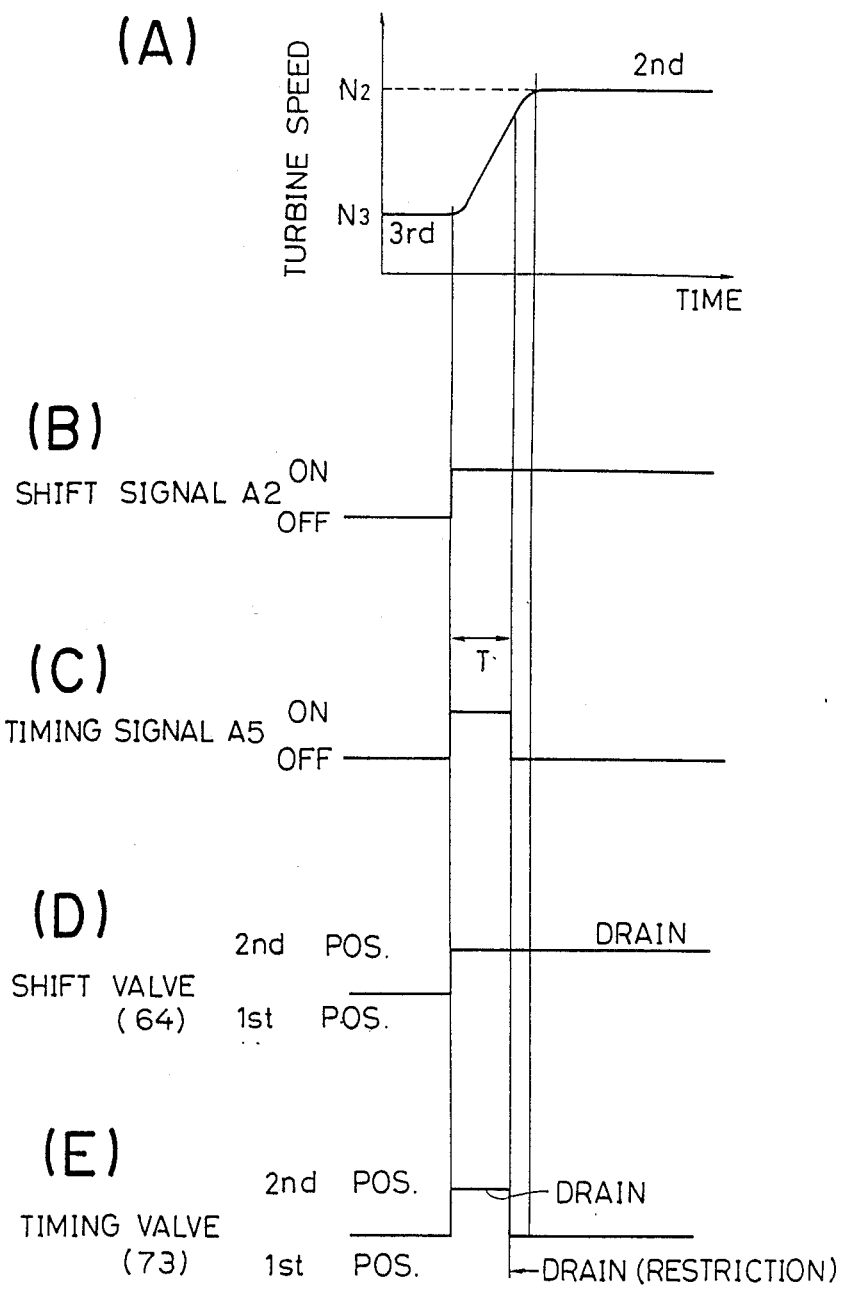
FIG. 3 is a timing diagram showing various signals and the operation of the valves during the gear shift down from the third stage to the second stage.

According to the present invention, the timings of the operations of the solenoid valves are appropriately controlled so that the gear shifting operations are carried out without appreciable shift shocks. Referring to FIG. 3, there are shown a shift signal $A_2$ which is to be applied to the 2-3 shift solenoid valve 52 and a timing signal $A_5$ which is to be applied to the timing control solenoid valve 47. When the transmission gear mechanism 2 is in the second stage, the signals $A_2$ and $A_5$ are both OFF so that the 2-3 shift valve 64 is in the position wherein it opens the passage 132 to the pressure line 111 to thereby apply the hydraulic pressure to the front clutch actuator 41. Thus, the front clutch 16 is engaged. Further, the 3-2 timing valve 73 is in the position wherein it disconnects the the line 136 from the drain line 137' so that the second brake actuator 45 is applied with the hydraulic pressure. Thus, the second brake 19 is released.

In shifting down from this position to the second gear stage, the shift signal $A_2$ is produced as shown in FIG. 3 (B) to thereby energize the 2-3 shift solenoid valve 52.

Thus, the 2-3 shift valve 64 is shifted to the second position as shown in FIG. 3 (D) to open the line 132 to the drain line. The pressure in the line 132 is therefore decreased so that the front clutch 16 is shifted from the engaged position to the released position. The timing signal $A_5$ is simultaneously produced as shown in FIG. 3 (C) to shift the timing valve 73 to the second position so that the pressure in the line 136 is released to the drain line 137'. It will be noted in FIG. 3 that the timing signal $A_5$ is produced simultaneously with the shift signal $A_2$ and continued for a time period T. After the time period T, the timing valve 73 is shifted to the first position as shown in FIG. 3 (E). Thereafter, the pressure in the second brake actuator 45 is released relatively slowly through the one-way orifice 74 and the 2-3 shift valve 64. More specifically, the second brake 19 is released relatively rapidly in the initial period T but relatively slowly in the remaining period of operation.

Figure 5:
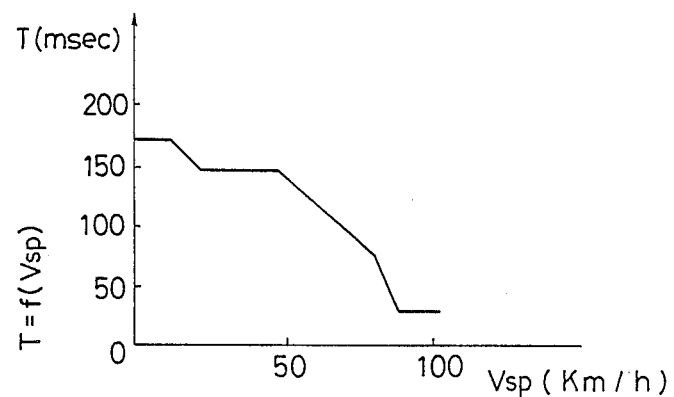
FIG. 5 is a diagram showing a map for determining the basic value of the predetermined time period.

According to the embodiment which is being described, the time period T is changed in accordance with the vehicle speed as shown in FIG. 5. It should however be noted that the time period T may be changed depending on the speed of the torque converter turbine, the engine throttle valve position and/or the rate of change of the engine throttle valve position.

When the transmission gear mechanism is shifted from the third gear stage to the second gear stage, the turbine speed TREV is changed from the value $N_3$ which is appropriate to the third gear stage to the value $N_2$ which is appropriate to the second gear stage. It may be judged that the shift down operation is completed when the rate of change of the turbine speed $V_{TREV}$ becomes one-half of the maximum value $V_{TREVM}$.

Figure 6:
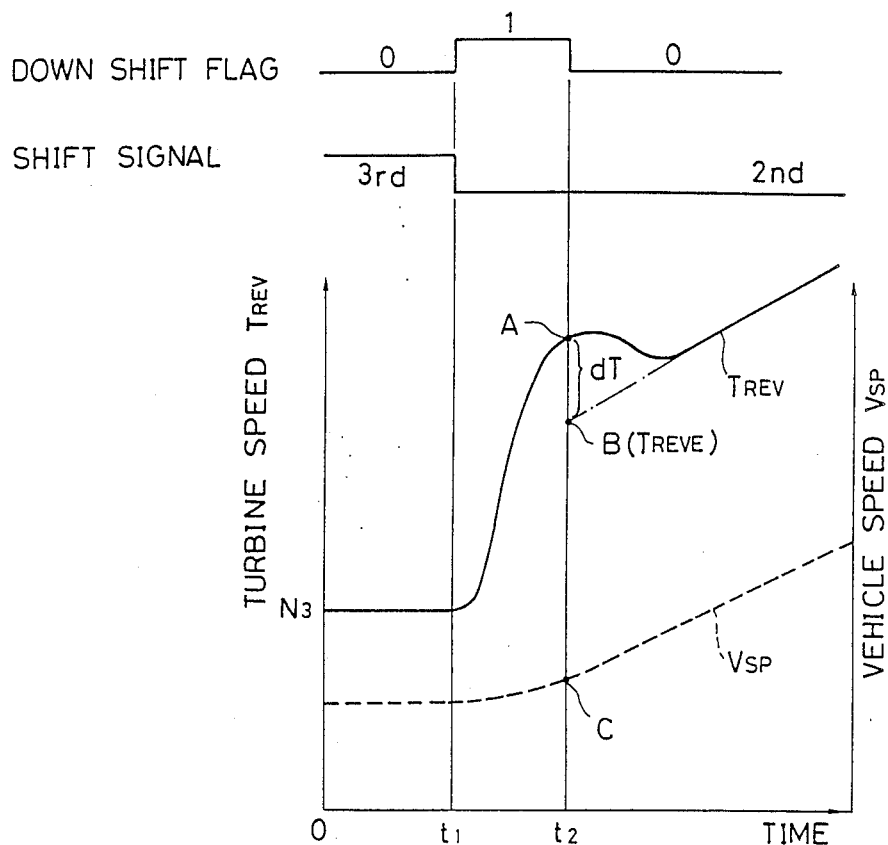
FIG. 6 is a diagram for obtaining a predicted turbine speed when the judgement is made that the gear shifting operation is finished.

The time period T is controlled in accordance with the actual turbine speed TREV which is obtained when the completion of the shift down operation is detected. Referring to FIG. 6, the signals $A_1$ and $A_2$ are produced at the timing $t_1$ wherein the shift down flag is set from 0 to 1 and the shift down operation is completed at the timing $t_2$ wherein the shift down flag is set from 1 to 0. The turbine speed at the timing $t_2$ is shown in FIG. 6 by A and the vehicle speed $V_{sp}$ at this timing is shown by C. A predicted turbine speed $T_{REVE}$ at the second gear stage corresponding to this actual vehicle speed $V_{sp}$ as shown by C is calculated and shown by the point B. By obtaining the predicted turbine speed $T_{REVE}$ in this manner, it is possible to determine the predicted turbine speed precisely without being affected for example by the engine throttle valve position.

Figure 9:
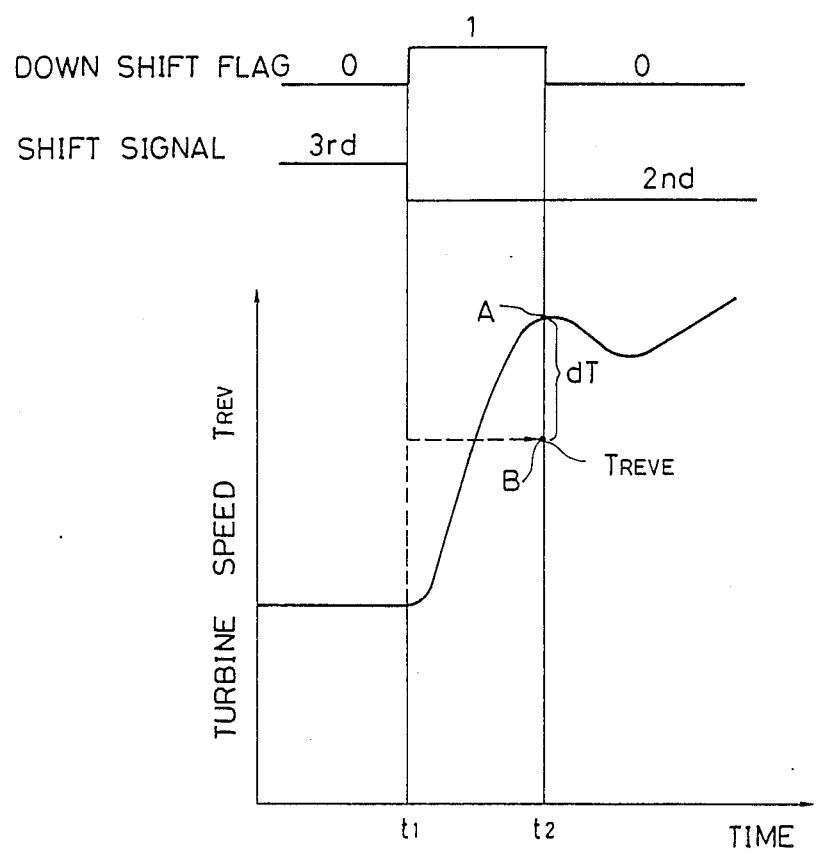
FIG. 9 is a diagram showing another example of obtaining the predicted turbine speed when the gear shift operation is completed.

FIG. 9 shows another way of determining the predicted turbine speed $T_{REVE}$. In this method, the predicted turbine speed is calculated based on the turbine speed at the timing $t_1$ when the shifting is started. This method is advantageous in that a vehicle speed detector is not required.

Referring again to FIG. 6 or to FIG. 9, the difference between the actual turbine speed as shown by the point A and the predicted turbine speed as shown by the point B is the increase in the turbine speed dT. The time period T is modified in accordance with the increase in the turbine speed dT. It is possible to obtain the increase in the turbine speed from the actual engine speed and the predicted engine speed in the second gear stage.

Figure 7:
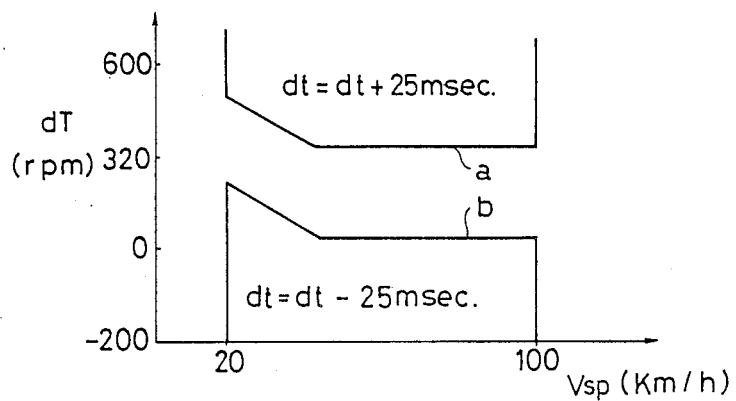
FIG. 7 is a diagram showing a map for determining the compensating value of the predetermined time period.

FIG. 7 shows a manner of determining the modification value dt for the time period T based on the increase in the turbine speed dT. In FIG. 7, the upper limit a and the lower limit b for the turbine speed increase dT is in advance determined in accordance with the vehicle speed. In case where the value dT is greater than the value a, it is judged that the turbine speed increase dT is excessive so that the value dt is determined to increase the time period T. To the contrary, in case where the turbine speed increase is smaller than the value b, the modification value dt is determined so that the time period T is decreased. According to the embodiment which is being described, the modification value dt is determined relatively small so that any influence of noise can be avoided. For example, the modification value dt may be 25 milli-seconds as shown in FIG. 7.

Figure 8:
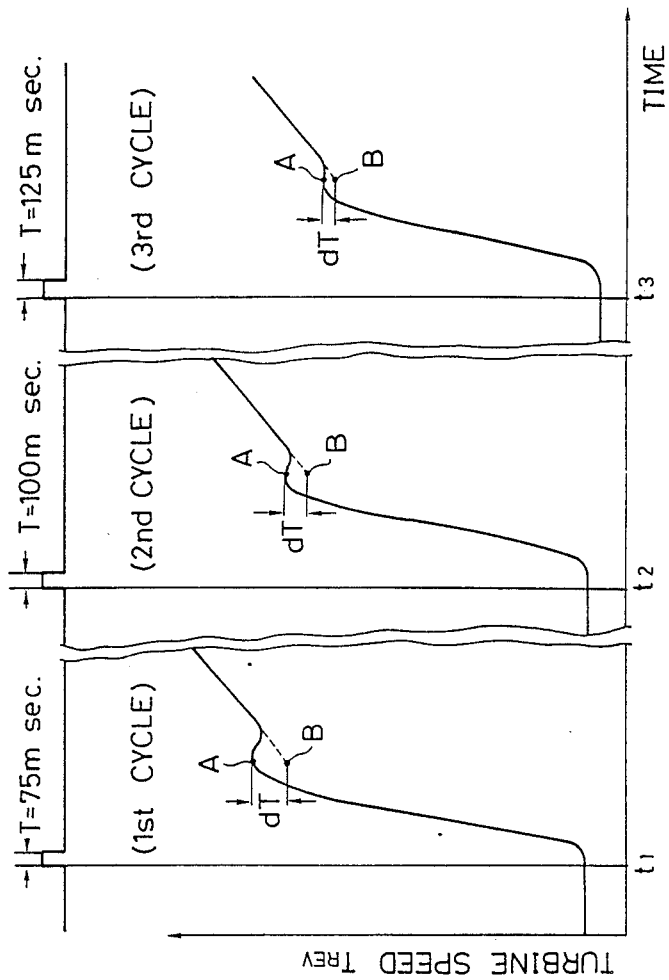
FIG. 8 is a diagram showing the extent of decrease of the shift shock.

Referring to FIG. 8, there is shown a control in which the time period T is increased. When the transmission gear mechanism is shifted from the third stage down to the second stage for the first time, the time period T may be for example 75 milli-seconds. If in this shift down operation the turbine speed increase dT is relatively large and greater than the value a, the time period value T=75 is increased by a modification value dt=25 to yield a new time period value T=100 milli-seconds for the next shift down from the third to the second gear stage. In the second shift down operation from the third stage to the second stage with the new time period of T=100 milli-seconds, the turbine speed increase dT may still be greater than the value a. Then, the time period T is again increased by a value dt=25 to yield a new time period value of T=125 milli-seconds which is used for the next gear shifting from the third to the second gear stage. With this new time period, the turbine speed increase dT is further decreased.

Figure 4:
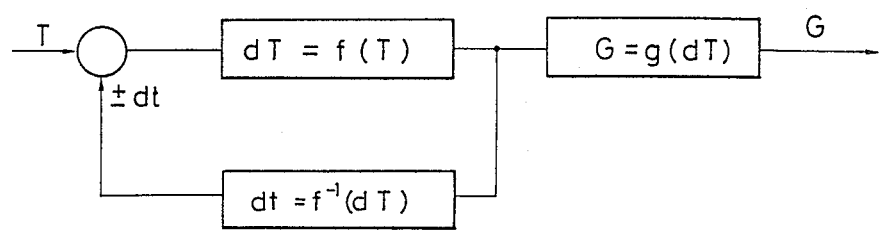
FIG. 4 is a diagram showing the manner of changing the predetermined time period.

In case where the turbine speed increase dT is smaller than the value b, the time period T is modified by subtracting a modification value dt=25. FIG. 4 shows the aforementioned control in a block diagram. In FIG. 4, the extent of the gear shift shock is shown by a value of the acceleration in the fore-and-aft direction of the vehicle. With the control as described, it is possible to determine the time period T which can minimize the shift shock.

Figure 10:
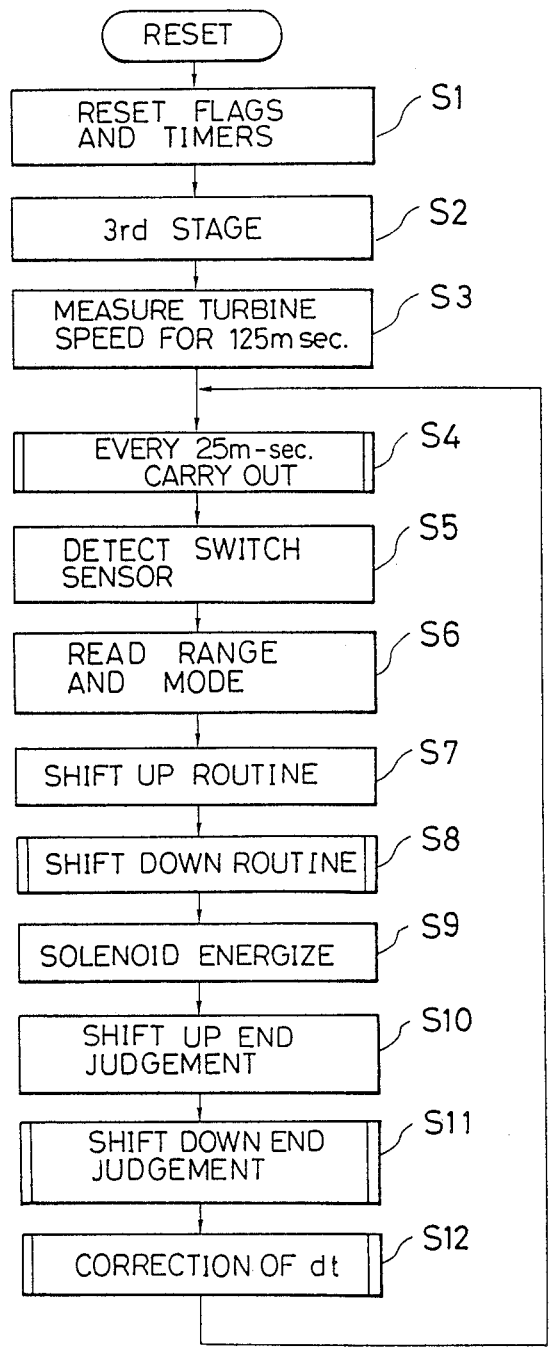

Referring now to FIG. 10, there is shown a flow chart showing steps in the shift down control. In the steps S1 to S3, the control unit 200 is initialized. More specifically, the flags and timers are reset in the step S1 and the transmission gear mechanism is positioned in the third stage as shown in the step S2. The torque converter turbine speed is then measured for 125 milli-seconds in the step S3.

The steps S4 through S12 are carried out every 25 milliseconds. The mode switch for indicating the operating mode of the transmission such as a normal, power or economy mode, is checked in order to determine which mode is selected and the sensor is inspected detecting the shift range currently selected from among a parking (P), reverse (R), neutral (N), drive (D), second (2) and low (1) shift ranges. In the steps S7 and S8, sub-routines for carrying out the judgement as to whether a shift up or a shift down is to be effected. In the step S9, a signal is applied to the appropriate solenoid valve to effect the required shift operation. In the steps S10 and S11, subroutines are carried out for the judgements of the completions of the shift up and the shift down operations. In the step 12, the new time period T is determined for the next shift down from the third to the second gear stage.

Figure 11:
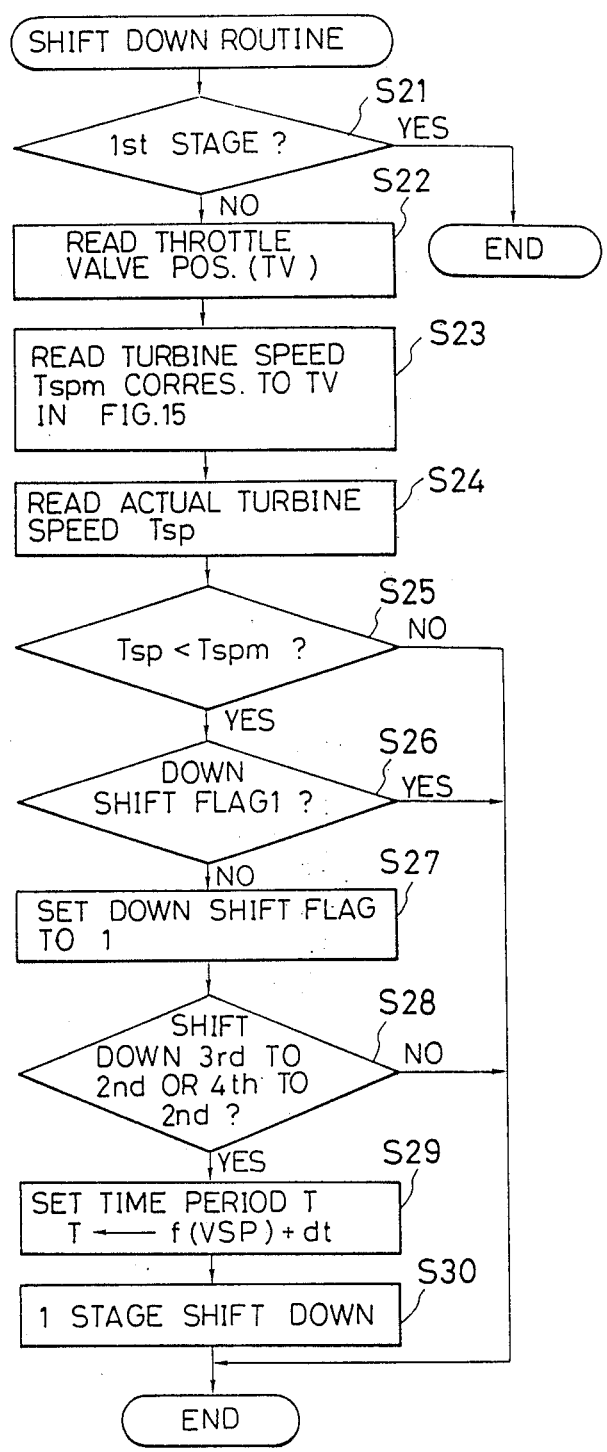
Figure 15:
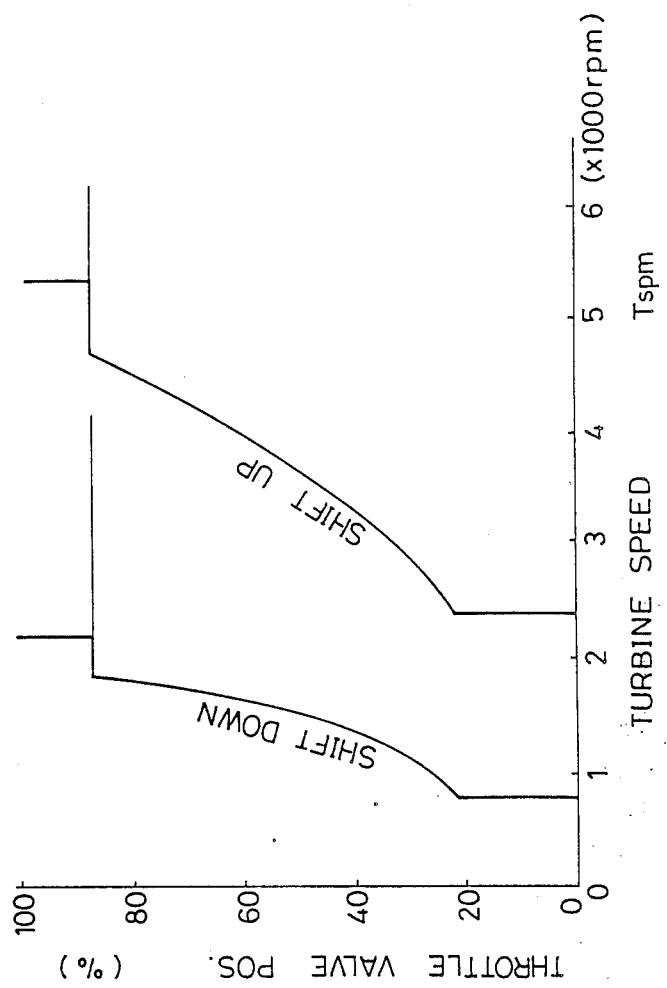
FIG. 15 is a diagram showing the gear shift pattern.

Referring to FIG. 11 which shows the sub-routine for judgement as to whether the shift down is to be carried out or not, the position of the transmission gear mechanism is detected in the step S21 and a judgement is made as to whether the transmission gear mechanism is in the first gear stage. If the transmission gear mechanism is in the first stage, the control is finished. If the gear mechanism is not in the first gear stage, the step S22 is carried out to read the engine throttle valve position. Then, in FIG. 15, a preset torque converter turbine speed $T_{spm}$ is obtained based on the throttle valve position as shown by the step S23. Then, the step S24 is carried out to read the actual turbine speed $T_{sp}$. The value $T_{sp}$ is compared in the step S25 with the value $T_{spm}$ to judge as to whether the latter value is larger than the former value. In case where the value $T_{spm}$ is larger than the value $T_{sp}$, a judgement is made in the step S26 as to whether the down shift flag is in the "1" position. In case where the flag is 1, the control is finished.

If the down shift flag is in "0" postion, the flag is set to the "1" position in the step S27 and a judgement is made in the step S28 as to whether the shift down is from the third stage to the second stage or from the fourth stage to the second stage. If the answer of the judgement in the step S28 is NO, it is judged that the shift down is from the second stage to the first stage and the control is finished. If the result of the judgement in the step S28 is YES, the time period T is determined based on the value obtained by the map f(vsp) shown in FIG. 5 in accordance with the vehicle speed and added with the modification value dt which is already memorized for the particular shift down operation. Then, the gear mechanism is shifted down to the one lower stage in the step S30.

Figure 12:
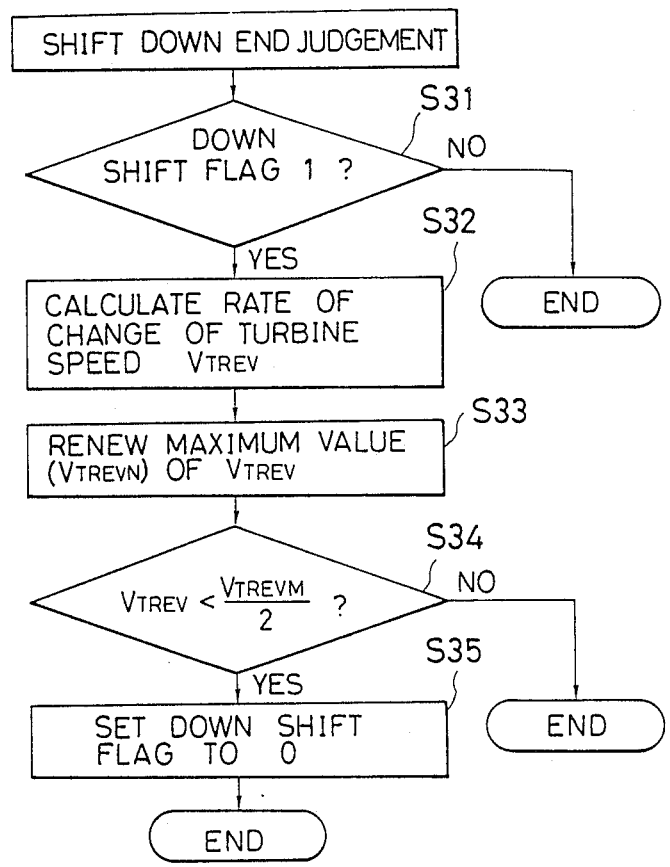

Referring to FIG. 12, there is shown a sub-routine for determining the completion of the shift down operation. In the step S31, a judgement is made as to whether the shift down flag is 1 or not and the control is finished if the flag is not in the position 1. If the flag is in the 1 position, the step S32 is carried out to calculate the rate of change of the turbine speed $V_{TREV}$. Then, from said third gear stage to said second gear stage. In the step S33, the maximum value $V_{TREVM}$ of the rate of change of the turbine speed is renewed to the value as obtained in the shift down operation which is being progressed. Then, a judgement is made in the step S34 as to whether the rate $V_{TREV}$ is smaller than one-half of the maximum value $V_{TREVM}$. If the answer to the judgement is NO, the control is finished. If the result of the judgement in the step S34 is YES, the flag is set to 0 in the step S35 and the control is finished.

Referring now to FIG. 13, there is shown a subroutine for determining the time period T for the shift down from the third stage to the second stage or from the fourth stage to the second stage. At first, a judgement is made in the step S41 as to whether the operation is in the shift down from the third stage to the second stage or from the fourth stage to the second stage. If the operation is one of these shift down conditions, the step S42 or S43 is carried out to calculate the predicted turbine speed $T_{REVE}$ from the turbine speed of the timing wherein the shift down operation is initiated and the gear ratios of the particular gear stages concerned. For example, the step S42 is carried out for the down shift from the third stage to the second stage whereas the step S43 is carried out for the shift down from the fourth stage to the second stage.

Then, the operation proceeds to the step S44 wherein the vehicle speed is read and a judgement is made in the step S45 as to whether the timing is immediately after the down shift flag is moved from the position 1 to the position 0. When the judgement in the step S45 is NO, the control is finished. If, however, the result of the judgement in the step S45 is YES, the step S46 is carried out to calculate the increase in the turbine speed dT based on the actual turbine speed $T_{REV}$ and the predicted turbine speed $T_{REVE}$.

Then, the operation proceeds to the step S47 to determine whether the value dT is greater than the value a. If the value dT is greater than the value a, the modification value dt for the time period T is further modified in the step S48 by subtracting 25 milli-seconds from the value dt which has been obtained in the previous corresponding shift down operation to obtain a corrected modification value dt. The corrected modification value dt is memorized as the newest modification value dt(vsp) which is to be used in the next shift down operation.

If the judgement in the step S47 is NO to indicate that the value dT is not greater than the value a, a judgement is further made in the step S49 as to whether the value dT is smaller than the value b. If the value dT is smaller than the value b, the value dt is modified in the step S50 by adding 25 milli-second to obtain a corrected modification value dt. Then, the corrected value dt is memorized in the step S51 for use in the next down shift operation. In case where the value dT is not smaller than the value b, it is not required to modify the value dt so that the value is memorized as it is.

Figure 14:
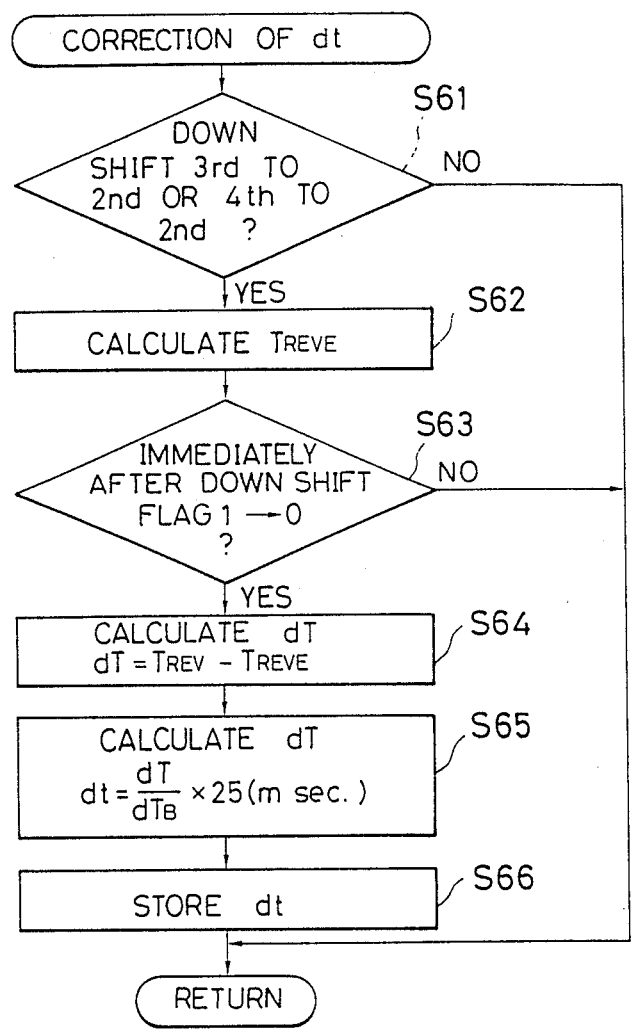

FIG. 14 is an example of the control wherein the turbine speed increase dT is modified in accordance with the predetermined reference value $dT_B$. In the control shown in FIG. 14, the steps S61 to S64 corresponds to the steps S41 to S46, respectively. However, in the control of FIG. 14, the vehicle speed $V_{sp}$ is not used so that there is no step corresponding to the step S44. In the step S65, the modification value dt is calculated and a constant value 25 milli-seconds is multiplied with the value dT and the product is divided by the reference value $d_{TB}$ to obtain the modification value dt which is memorized in the step S66. The modification value dt which has previously been memorized is added to the time period T to obtain a new time period for use in the shift down operation which is being progressed.

Figure 16:
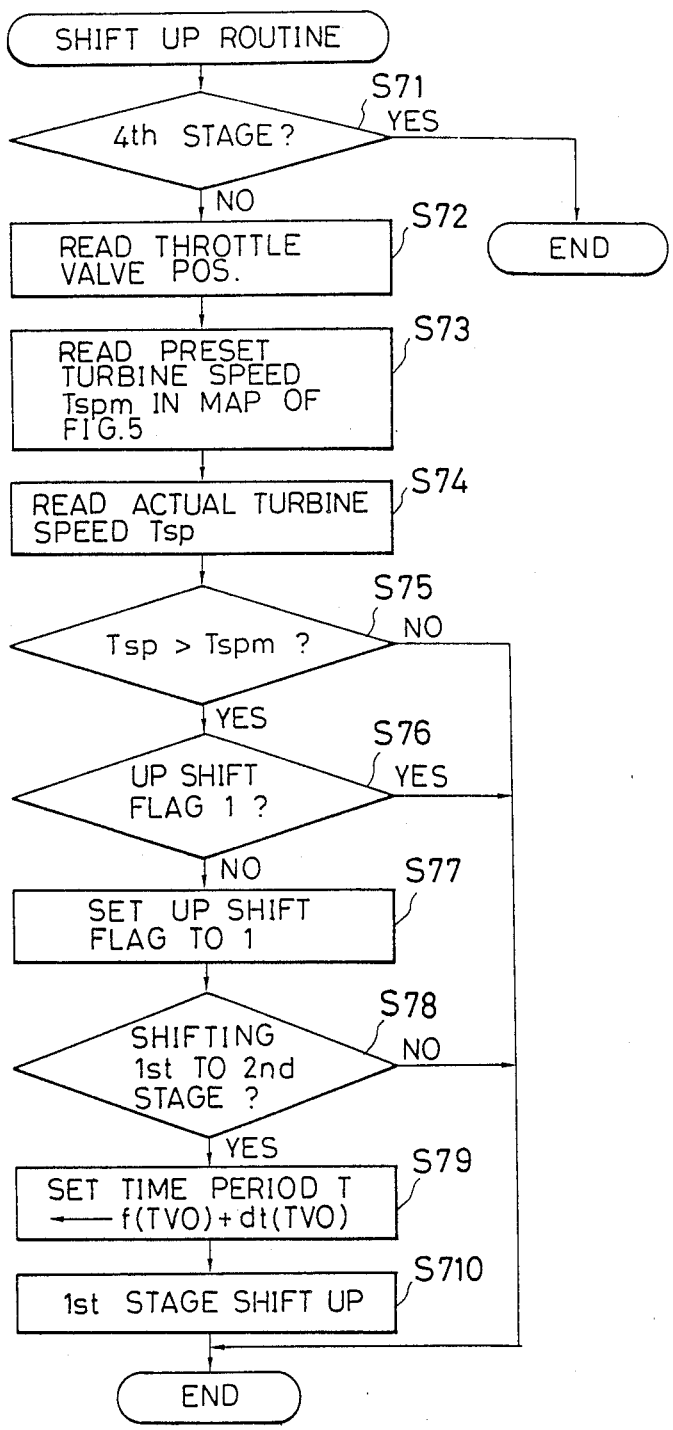
FIGS. 16 through 19 show flow charts of the shift up operation of the control unit.

Referring to FIG. 16, there is shown a sub-routine for the shift up judgement as shown by the step S7 in FIG. 10. At first, in the step S71, the gear stage of the transmission gear mechanism is read and a judgement is made as to whether the gear stage is in the fourth. If the transmission is in the fourth gear stage, the control is finished because no further shift up is possible. If the transmission gear mechanism is in the stage other than the fourth stage, the engine throttle valve position is detected in the step S72 and the preset turbine speed $T_{spm}$ corresponding to the throttle valve position is obtained in the step S73 from the shift up map shown in FIG. 5. Thereafter, the actual turbine speed $T_{sp}$ is read in the step S74 from the turbine speed detector.

Figure 20:
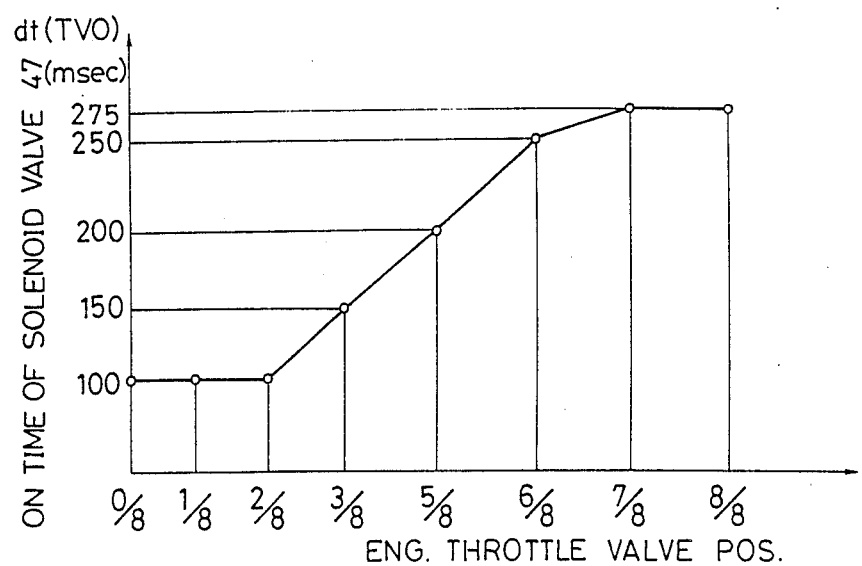
FIG. 20 is a diagram showing the map for the operation of the second solenoid valve with respect to the engine throttle valve opening.
Figure 23:
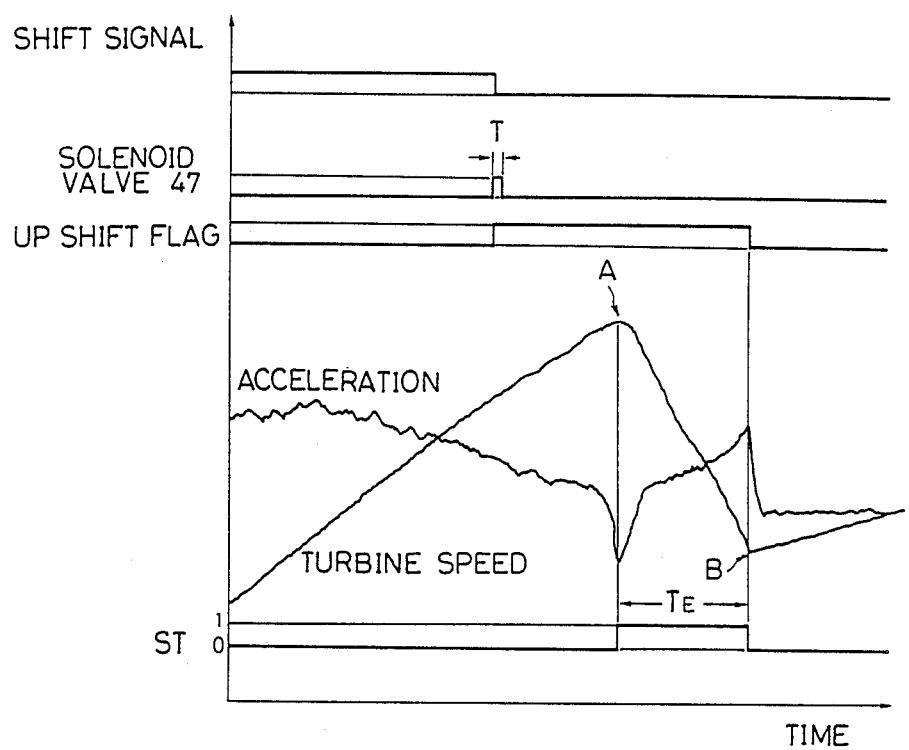
FIG. 23 is a diagram showing the operation in shift up control.

Then, the step S75 is carried out to compare the preset turbine speed $T_{spm}$ with the actual speed $T_{sp}$. If the former value is larger than the latter value, the control is finished. If the value $T_{spm}$ is smaller than the actual value $T_{sp}$, the shift up operation is carried out by checking whether the up shift flag is in the position "1" or not in the step S76. If the flag is in the 1 position, the control is finished but if the flag is not in 1 position the flag is set to the 1 position in the step S77 and then a judgement is made in the step S 78 as to whether the shift up operation is from the first stage to the second stage. If the shift up is from the first stage to the second stage, the step S 79 is carried out to obtain the time period T in accordance with the throttle valve position based on the relationship f(TVO) shown in FIG. 20 and the modification value dt(TVO) which has previously been obtained in the latest corresponding shift up operation. Then, the gear shift up is effected in the step S710. In the shift up operation from the first stage to the second stage, the solenoid valve 47 is energized for the time period T in the initial stage of the shift up operation to make the rate of engagement of the second brake 19 faster as shown in FIG. 23.

Figure 17:
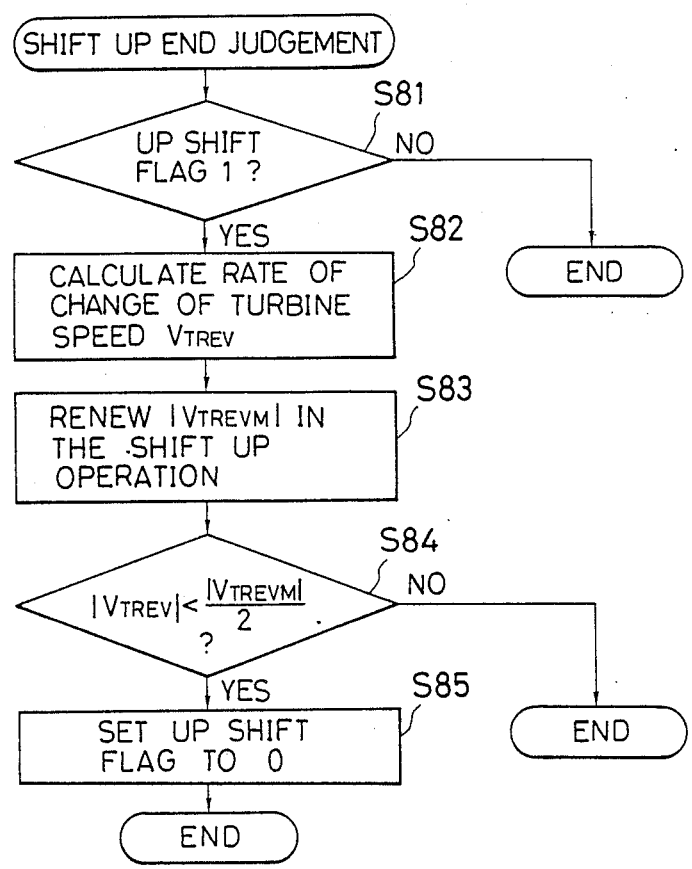

Referring to FIG. 17, there is shown the manner of determining the end of the shift up operation. In the step S81, a judgement is made as to whether the up shift flag is in the 1 position. When the flag is in the 1 position, the step S82 is carried out to calculate the rate $V_{TREV}$ of change of the turbine speed. The step S83 is then carried out to renew the absolute value of the maximum value $V_{TREVM}$ and compare the rate $V_{TREV}$ with one-half of the maximum value $V_{TREVM}$ in the step S84 to judge if the control is in the point B as shown in FIG. 23. If the former value is smaller than the latter value, the up shift flag is set to 0 and the control is finished.

Figure 18:
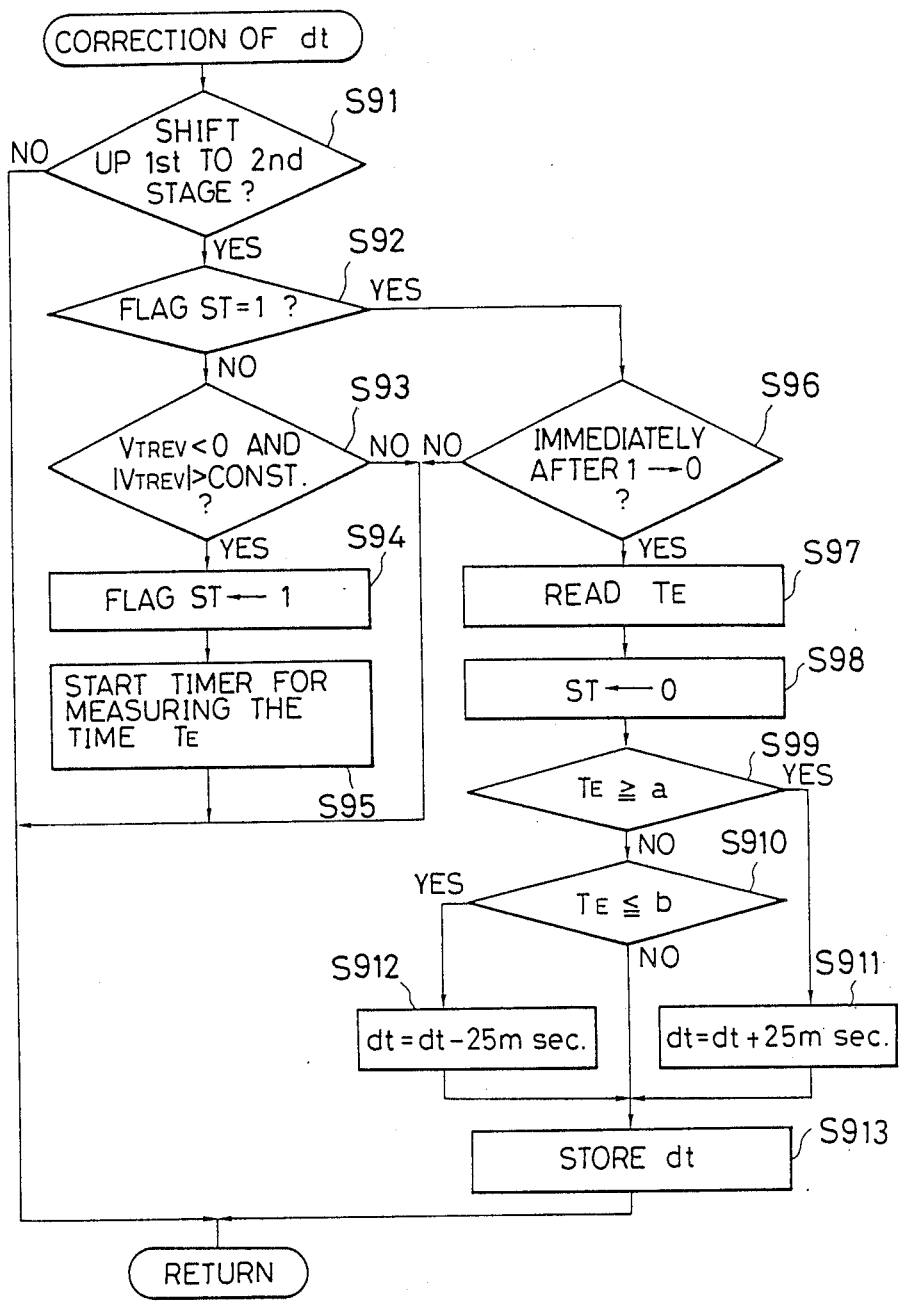
Figure 22:
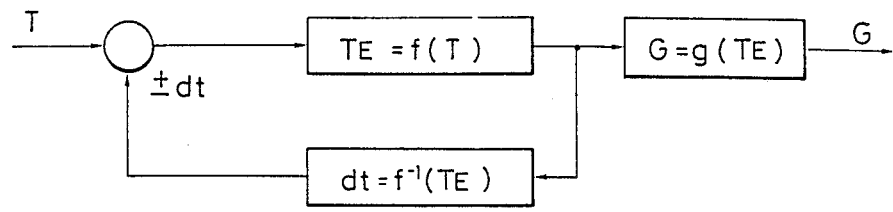
FIG. 22 is a block diagram showing the operation of the control unit.

FIG. 22 shows a control block diagram similar to FIG. 4 but corresponding to the shift up operation. Referring to FIG. 18, there is shown a procedure for correcting the modifying value dt for the next shift up operation. In FIG. 18, a judgement is made in the step S91 as to whether the procedure is in the shift up from the first gear stage to the second gear stage and if the answer is YES the time period T is modified in accordance with the result of the shift up operation. In the step S92, a value of an engaging time measuring flag ST for measuring the time from the start to the finish of the engagement of the second brake 19 is determined. When the flag is in "0" position the step S93 is carried out to judge as to whether the rate of change of the turbine speed $V_{TREV}$ is negative and the absolute value of the change rate is constant. The condition corresponds to the position A in the curve in FIG. 23. If it is found in the step S93 that this condition is met, the step S94 is carried out to set the engaging time measuring flag ST to 1. Then, the timer is started in the step S95 to measure the shifting time $T_E$ and the control is finished.

When it is judged that the measuring flag ST is set to 1 in the step S92, the procedure is progressed to the step S96 wherein a judgement is made as to whether the timing is immediately after the up shift flag is turned from 1 to 0. This is to judge if the condition is in the point B in FIG. 23. If the result of the judgement is YES, the step S97 is carried out to read the timer to thereby determine the second brake engaging time $T_E$ and return the measuring flag to 0 in the step S98.

Figure 21:
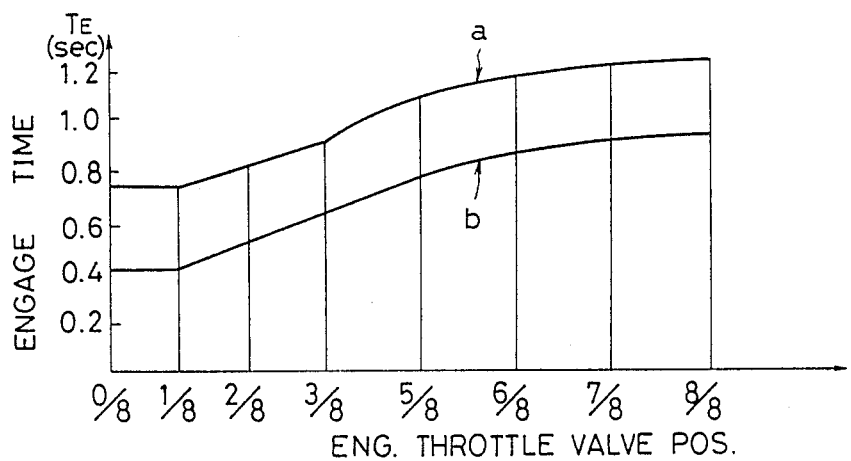
FIG. 21 is a diagram showing an appropriate range of the slip in the friction device.

As shown in FIG. 21, there are provided an upper limit a and a lower limit b for the engaging time $T_E$. The engaging time $T_E$ is then compared with the value a in FIG. 21 in the step S99 and if the value $T_E$ is greater than the upper limit value a, the modification value dt is increased by with 25 milli-seconds to obtain a corrected modification value dt in the step S911 and the corrected modification value dt is memorized in the step S913 for the next corresponding shift up operation. If the engaging time $T_E$ is not greater than the upper limit a, a judgement is made in the step S910 to compare the time $T_E$ with the lower limit b. If the time $T_E$ is smaller than the lower limit b, a value of 25 milli-seconds is subtracted from the modification value dt to obtain a corrected modification value dt which is memorized in the step S913 for the use in the next corresponding shift up operation. If the time $T_E$ is not smaller than the lower limit b, the value dt is memorized as it is in the step S913.

Figure 19:
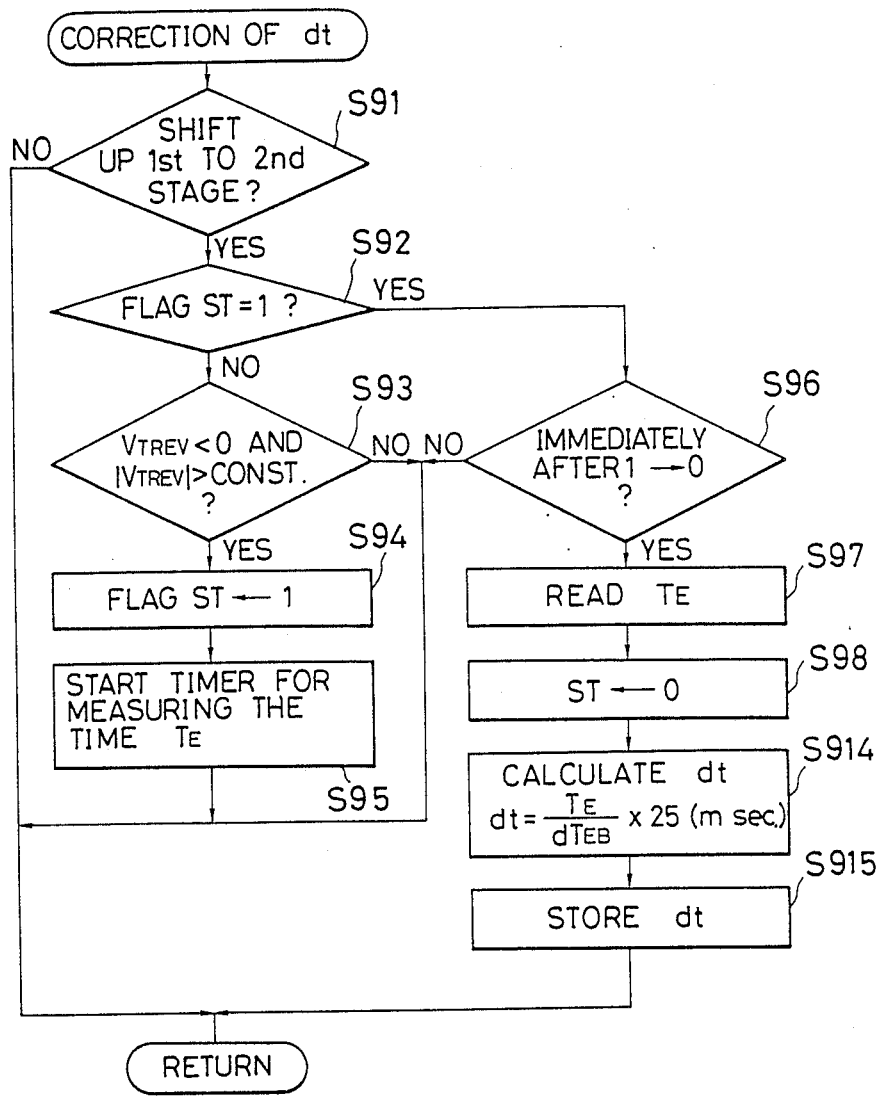

In FIG. 19, there is shown another example of the process for modifying the second brake engaging time. In the process shown in FIG. 19, the steps S91 through S98 are the same as those in the process shown in FIG. 18. In the process of FIG. 19, there is provided a predetermined reference engaging time $dT_{EB}$ and the engaging time $T_E$ is multiplied by 25 milli-seconds and the product thus obtained is divided by the reference value $dT_{EB}$ to obtain a corrected modification value dt.

The invention has been shown and described with reference to the specific embodiment. However, it should be noted that the invention is in no way limited to the details of the illustrated structures and the described control but changes and modifications may be made without departing from the scope of the appended claims.

We claim:

1. A vehicle automatic transmission including
   a transmission gear mechanism having an input means for introducing power from an engine and a plurality of gear stages of different gear ratios,
   a plurality of friction mechanisms which are adapted to be selectively engaged to select one of the gear stages,
   speed adjusting means for adjusting a rate of engagement of the friction mechanisms,
   control means for controlling the speed adjusting means to engage at least one of the friction mechanisms at a faster rate in an initial period from a start of an engaging operation for a predetermined time period than in a remaining period of the engaging operation,
   speed detecting means for detecting a rotation speed of the input means of the transmission gear mechanism,
   said control means including compensation means responsive to a change in the rotation speed of the input means of the transmission gear mechanism for changing, based on the change in the rotation speed of the input means of transmission gear mechanism during the latest gear shifting operation, said predetermined time period for a next gear shifting operation.

2. An automatic transmission in accordance with claim 1 in which said one friction mechanism is associated with the transmission gear mechanism so that a first gear stage is established when the one friction mechanism is disengaged and a second gear stage which is higher than the first gear stage is established when the one friction mechanism is engaged, said speed adjusting means being operative in a shift up operation from the first gear stage to the second gear stage.

3. An automatic transmission in accordance with claim 2 in which hydraulic actuating means is provided for actuating said one friction mechanism, said speed adjusting means including flow restriction means for restricting hydraulic flow to said actuating means and passage means bypassing said flow restriction means, said passage means being provided with valve means for closing said passage means.

4. An automatic transmission in accordance with claim 2 in which said compensation means responsive to a change in the rotation speed of the input means of the transmission gear mechanism includes first means for detecting a change in the rotation speed of said input means of the transmission gear mechanism during a gear shifting operation, second means for comparing an output of said first means with a reference value and determining a modifying time, means for memorizing said modifying time, third means for adding said modifying time to a predetermined time which is determined in accordance with a gear shifting condition in a next gear shifting operation, said first means being means for detecting a time period from a start of the change in the rotation speed of the input means of the transmission gear mechanism to an end of the change in the rotation speed.

5. An automatic transmission in accordance with claim 1 in which said transmission gear mechanism has a first gear stage, a second gear stage which is higher than said first gear stage and a third gear stage which is higher than said second gear stage, said one friction means being associated with said transmission gear mechanism so that it is engaged to establish said second gear stage and disengaged to establish said third gear stage, said engagement rate adjusting means being operative in a shift down operation from said third gear stage to said second gear stage.

6. An automatic transmission in accordance with claim 5 in which hydraulic actuating means is provided for actuating said one friction mechanism, said speed adjusting means including flow restriction means for restricting hydraulic flow to said actuating means and passage means bypassing said flow restriction means, said passage means being provided with valve means for closing said passage means.

7. An automatic transmission in accordance with claim 5 in which said compensation means responsive to a change in the rotation speed of the input means of the transmission gear mechanism includes first means for detecting a change in the rotation speed of said input means of the transmission gear mechanism during a gear from said third gear stage to said second gear stage shifting operation, second means for comparing an output of said first means with a reference value and determining a modifying time, means for memorizing said modifying time, third means for adding said modifying time to a predetermined time which is determined in accordance with a gear shifting condition in a next gear shifting operation, said first means being means for detecting a difference between a predicted speed of said input means of the transmission gear mechanism and an actual speed of said input means.

8. An automatic transmission in accordance with claim 1 in which said transmission gear mechanism has a first gear stage, a second gear stage which is higher than said first gear stage and a third gear stage which is higher than said second gear stage, said one friction means being disengaged in said first and third gear stages and engaged in said second gear stage, said engagement rate adjusting means being operated in a shifting up from said first gear stage to said second gear stage and in a shifting down from said third gear stage to said second gear stage.

9. An automatic transmission in accordance with claim 8 in which hydraulic actuating means is provided for actuating said one friction mechanism, said speed adjusting means including flow restriction means for restricting hydraulic flow to said actuating means and passage means bypassing said flow restriction means, said passage means being provided with valve means for closing said passage means.

10. An automatic transmission in accordance with claim 1 in which said compensation means includes first means for detecting a change in the rotation speed of said input means of the transmission gear mechanism during a gear shifting operation, second means for comparing an output of said first means with a reference value and determining a modifying time, means for memorizing said modifying time, third means for adding said modifying time to a predetermined time which is determined in accordance with a gear shifting condition in a next gear shifting operation.

11. An automatic transmission in accordance with claim 10 in which said first means being means for detecting a time period from a start of the change in the rotation speed of the input means of the transmission gear mechanism to an end of the change in the rotation speed.

12. An automatic transmission in accordance with claim 10 in which said first means being means for detecting a difference between a predicted speed of said input means of the transmission gear mechanism and an actual speed of said input means.

13. An automatic transmission in accordance with claim 10 in which said second means being means for comparing the output of said first means with said reference value and changing the modifying time by a constant amount depending on the result of the comparison.

14. An automatic transmission in accordance with claim 10 which said second means being means for calculating a ratio of the output of the first means to said reference value and determining the modifying time in accordance with the ratio.

15. An automatic transmission in accordance with claim 10 in which said predetermined time is determined in accordance with engine loads.

16. An automatic transmission in accordance with claim 10 in which said predetermined time is determined in accordance with a vehicle speed.

17. An automatic transmission in accordance with claim 10 in which different reference values are provided for different values of engine load.

18. An automatic transmission in accordance with claim 10 in which different reference values are provided for different values of vehicle speed.

19. An automatic transmission including a transmission gear mechanism having input means for introducing power from an engine and a plurality of gear stages of different gear ratios, first and second friction means for selecting one of said gear stages, first and second actuating means respectively for actuating said first and second friction means, a hydraulic circuit for controlling a supply of hydraulic pressure to said first and second actuating means, control means for controlling the hydraulic circuit to supply the hydraulic pressure to said first and second actuating means for establishing a first condition in which said first means for establishing a first condition in which said first friction means is engaged and said second friction means is disengaged to select a first one of said gear stages and to release the hydraulic pressure from said first and second actuating means for establishing a second condition in which said first friction means is disengaged and said second friction means is engaged to select a second one of said gear stages which is lower than said first gear stage, pressure release rate adjusting means for adjusting a rate of releasing the hydraulic pressure from said second actuating means, said control means being means for controlling said pressure release rate adjusting means in a shifting down operation from said first one of the gear stages to said second one of the gear stages so that the pressure release from said second actuating means is made at a faster rate for a predetermined time period in an initial period than in a remainder period, shift condition detecting means for detecting a shift condition from said first stage to said second stage based on a rotation speed of said input means, compensation means responsive to said shift condition detected by the shift condition detecting means for modifying said predetermined time period for a next gear shifting operation.

* * * * *